(12) United States Patent
Johns

(10) Patent No.: US 10,503,910 B2
(45) Date of Patent: *Dec. 10, 2019

(54) SECURITY TESTING FRAMEWORK INCLUDING VIRTUALIZED SERVER-SIDE PLATFORM

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 184 days.

This patent is subject to a terminal disclaimer.

(21) Appl. No.: 15/615,603

(22) Filed: Jun. 6, 2017

(65) Prior Publication Data

US 2018/0349602 A1 Dec. 6, 2018

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01); *G06F 2221/034* (2013.01)

(58) Field of Classification Search
CPC ................. G06F 21/563; G06F 21/577; G06F 2221/034; G06F 21/552
See application file for complete search history.

(56) References Cited

U.S. PATENT DOCUMENTS

| | | | |
|---|---|---|---|
| 9,928,379 B1 * | 3/2018 | Hoffer | G06F 21/6245 |
| 2007/0083813 A1 * | 4/2007 | Lui | G06F 11/3612 |
| | | | 715/709 |
| 2009/0013312 A1 * | 1/2009 | Albert | G06F 11/3636 |
| | | | 717/128 |
| 2009/0198727 A1 * | 8/2009 | Duan | G06F 16/213 |

(Continued)

OTHER PUBLICATIONS

CWE-352: Cross-Site Request Forgery (CSRF). https://cwe.mitre.org/data/definitions/352.html. Jun. 2017.

(Continued)

*Primary Examiner* — J. Brant Murphy
(74) *Attorney, Agent, or Firm* — Fountainhead Law Group P.C.

(57) ABSTRACT

A web application security testing framework includes a HTTP browser engine replaying recorded sessions to identify candidate traces indicative of attack. A mutation engine changes values in the attack candidate traces to generate additional traces posed against a virtualized server-side platform. The virtualized server-side platform creates snapshots of application state for testing, avoiding permanent damage to application persistence. The virtualized server-side platform includes persistence monitoring sensors (e.g., at connectors to the database or file system) for detecting vulnerability classes including Cross-Site Request Forgery (CSRF) and SQL injection attacks. For remote command execution attack detection, a server-side vulnerability validation interface records strings passed to code generating application program interfaces (APIs). For possible Cross-Site Scripting (XSS) attacks, the mutation engine may detect HTTP responses for examination of generated web code, and the HTTP browser may be extended to include a vulnerability validation API that is automatically called by successfully injected attack payloads.

20 Claims, 15 Drawing Sheets

(56) References Cited

U.S. PATENT DOCUMENTS

| | | | | |
|---|---|---|---|---|
| 2011/0154473 | A1* | 6/2011 | Anderson | G06F 21/64 726/11 |
| 2013/0247204 | A1* | 9/2013 | Schrecker | H04L 45/306 726/25 |
| 2013/0312102 | A1* | 11/2013 | Brake | G06F 21/577 726/25 |
| 2014/0165204 | A1* | 6/2014 | Williams | G06F 21/577 726/25 |
| 2015/0373042 | A1* | 12/2015 | Tripp | H04L 63/1433 726/1 |
| 2017/0180318 | A1* | 6/2017 | Lutas | G06F 9/45558 |
| 2017/0208093 | A1* | 7/2017 | Williams | G06F 21/577 |

OTHER PUBLICATIONS

The owasp top 10 project (from 2007 to 2013). https://www.owasp.org/index.php/Category:OWASP\_Top\_Ten\_Project. Last modified on Aug. 21, 2015.

Adam Barth, Collin Jackson, and John C. Mitchell. Robust defenses for cross-site request forgery. In Proceedings of the 15th ACM Conference on Computer and Communications Security, CCS '08, pp. 75-88, New York, NY, USA, 2008. ACM.

Sam Burnett and Nick Feamster. Encore: Lightweight measurement of web censorship with cross-origin requests. In Proceedings of the 2015 ACM Conference on Special Interest Group on Data Communication, SIGCOMM 15, pp. 653-667, New York, NY, USA, 2015. ACM.

Jesse Burns. Cross Site Request Forgery—An introduction to a common web application weakness. Whitepaper, https://www.isecpartners.com/documents/XSRF_Paper_pdf, 2005.

Claudio Criscione. Drinking the Ocean—Finding XSS at Google Scale. Talk at the Google Test Automation Conference, (GTAC'13), http://goo.gl/8qqHA, Apr. 2013.

Renaud Feil and Louis Nyenegger. Evolution of cross site request forgery attacks. Journal in Computer Virology, 4 (1):61-71, Feb. 2007.

Tom Van Goethem, Mathy Vanhoef, Frank Piessens, and Wouter Joosen. Request and Conquer: Exposing Cross-Origin Resource Size. In 25th USENIX Security Symposium—USENIX Security, 2016.

Jeremiah Grossman, Robert Hansen, Petko Petkov, and Anton Rager. Cross Site Scripting Attacks: XSS Exploits and Defense. Syngress, 2007.

William G.J. Halfond, Alessandro Orso, and Panagiotis Manolios. Using Positive Tainting and Syntax-Aware Evaluation to Counter SQL Injection Attacks. In 14th ACM Symposium on the Foundations of Software Engineering (FSE), 2006.

Norm Hardy. The confused deputy: (or why capabilities might have been invented). SIGOPS Oper. Syst. Rev., 22 (4):36-38, Oct. 1988.

Martin Johns. On JavaScript Malware and Related Threats—Web Page Based Attacks Revisited. vol. 4, pp. 161-178, Aug. 2008.

Martin Johns and Justus Winter. RequestRodeo: Client Side Protection against Session Riding. In Frank Piessens, editor, Proceedings of the OWASP Europe 2006 Conference, refereed papers track, Report CW448, pp. 5-17. Departement Computerwetenschappen, Katholieke Universiteit Leuven, May 2006.

Nenad Jovanovic, Engin Kirda, and Christopher Kruegel. Preventing cross site request forgery attacks. In Second International Conference on Security and Privacy in Communication Networks and the Workshops, SecureComm 2006, Baltimore, MD, Aug. 28, 2006-Sep. 1, 2006, pp. 1-10, 2006.

Sebastian Lekies, Ben Stock, and Martin Johns. 25 Million Flows Later—Large-scale Detection of DOM-based XSS. In Proceedings of the 20th ACM Conference on Computer and Communication Security (CCS '13), 2013.

Sebastian Lekies, Walter Tighzert, and Martin Johns. Towards stateless, client-side driven Cross-Site Request Forgery protection for Web applications. In 5th conference on "Sicherheit, Schutz und Zuverlassigkeit" (GI Sicherheit 2012), Lecture Notes in Informatics (LNI), Mar. 2012.

Philippe De Ryck, Lieven Desmet, Thomas Heyman, Frank Piessens, and Wouter Joosen. CsFire: Transparent Client-Side Mitigation of Malicious Cross-Domain Requests. In 2nd International Symposium on Engineering Secure Software and Systems (ESSoS '10), pp. 18-34, 2010.

Philippe De Ryck, Lieven Desmet, Wouter Joosen, and Frank Piessens. Automatic and precise client-side protection against CSRF attacks. In European Symposium on Research in Computer Security (ESORICS 2011), vol. 6879 of LNCS, pp. 100-116, Sep. 2011.

Tom Van Goethem, Wouter Joosen, and Nick Nikiforakis. The clock is still ticking: Timing attacks in the modern web. In Proceedings of the 22nd ACM SIGSAC Conference on Computer and Communications Security, pp. 1382-1393. ACM, 2015.

Anne van Kesteren. The XMLHttpRequest Object. W3C Working Draft, http://www.w3.org/TR/XMLHttpRequest, Apr. 2008.

Gary Wassermann and Zhendong Su. Sound and Precise Analysis of Web Applications for Injection Vulnerabilities. In Proceedings of Programming Language Design and Implementation (PLDI'07), San Diego, CA, Jun. 10-13, 2007.

Gary Wassermann and Zhendong Su. Static Detection of Cross-Site Scripting Vulnerabilities. In Proceedings of the 30th International Conference on Software Engineering, Leipzig, Germany, May 2008. ACM Press New York, NY, USA.

William Zeller and Edward W. Felten. Cross-Site Request Forgeries: Exploitation and Prevention. Technical report, Princeton University, 2008.

Adam Doupe and Marco Cova and Giovanni Vigna. Why Johnny can't pentest: An analysis of black-box web vulnerability scanners. In DIMVA 2010, 2010.

Jason Bau, Elie Bursztein, Divij Gupta, and John Mitchell. State of the art: Automated black-box web application vulnerability testing. In Security and Privacy (SP), 2010 IEEE Symposium on, pp. 332-345. IEEE, 2010.

Johannes Dahse and Thorsten Holz. Simulation of built-in php features for precise static code analysis. In Symposium on Network and Distributed System Security (NDSS), 2014.

Johannes Dahse and Thorsten Holz. Static detection of second-order vulnerabilities in web applications. In USENIX Security Symposium, 2014.

Michael Felderer, Matthias Buchler, Martin Johns, Achim D. Brucker, Ruth Breu, and Alexander Pretschner. Security testing: A survey. Advances in Computers, 101:1-51, 2016.

Jeffrey S. Foster, Manuel Fahndrich, and Alexander Aiken. A theory of type qualiers. SIGPLAN Not., 34-5), May 1999.

Jeffrey S. Foster, Tachio Terauchi, and Alex Aiken. Flow-sensitive type qualiers. SIGPLAN Not., 37(5), May 2002.

WG Halfond, Jeremy Viegas, and Alessandro Orso. A classication of sql-injection attacks and countermeasures. In IEEE International Symposium on Secure Software Engineering, pp. 13-15, 2006.

Cameron Hotchkies. Blind sql injection automation techniques. Talk at the Black Hat conference, https://www.blackhat.com/presentations/bh-usa-04/bh-us-04-hotchkies/bh-us-04-hotchkies.pdf, 2004.

Yao-Wen Huang, Fang Yu, Christian Hang, Chung-Hung Tsai, Der-Tsai Lee, and Sy-Yen Kuo. Securing web application code by static analysis and runtime protection. In International Conference on the World Wide Web (WWW), WWW '04, pp. 40-52, New York, NY, USA, 2004. ACM.

Nenad Jovanovic, Christopher Kruegel, and Engin Kirda. Pixy: A static analysis tool for detecting web application vulnerabilities (short paper). In IEEE Symposium on Security and Privacy, SP '06, pp. 258-263, Washington, DC, USA, 2006. IEEE Computer Society.

Nenad Jovanovic, Christopher Kruegel, and Engin Kirda. Precise alias analysis for static detection of web application vulnerabilities. In Workshop on Programming languages and analysis for security, PLAS '06, pp. 27-36, New York, NY, USA, 2006. ACM.

Amit Klein. Blind XPath Injection. Whitepaper, Watchflre, http://www.modsecurity.org/archive/amit/blind-xpath-injection.pdf, 2005.

(56) References Cited

OTHER PUBLICATIONS

V. Benjamin Livshits and Monica S. Lam. Finding Security Vulnerabilities in Java Applications with Static Analysis. In USENIX Security Symposium, 2005.
Prateek Saxena, Devdatta Akhawe, Steve Hanna, Feng Mao, Stephen McCamant, and Dawn Song. A symbolic execution framework for javascript. In IEEE Symposium on Security and Privacy, SP '10, pp. 513-528, Washington, DC, USA, 2010. IEEE Computer Society.
Karen Scarfone, Murugiah Souppaya, Amanda Cody, and Angela Orebaugh. Technical Guide to Information Security Testing and Assessment. Special Publication 800-115, National Institute of Standards and Technology (NIST), 2008.
Zhendong Su and Gary Wassermann. The essence of command injection attacks in web applications. SIGPLAN Not., 41(1):372-382, Jan. 2006.
Yichen Xie and Alex Aiken. Static detection of security vulnerabilities in scripting languages. In USENIX Security Symposium, vol. 15, pp. 179-192, 2006.

* cited by examiner

```
[...]
selenium.init(driver);
selenium.push(driver,'cmd("'+driver+".manage().timeouts().implicitlyWait
(120000);",true)');
selenium.push(driver,'cmd("'+driver+".get(\\"'+baseUrl+'\\"+ \\"/\\"')',+'";',true)');
selenium.push(driver,'cmd("'+driver+".findElement(By.linkText(\\"My Account
\\"))"+".click()"+";",true)');
selenium.push(driver,'cmd("'+driver+".findElement(By.linkText(\\"Register\\")
)"+".click()"+";",true)');
selenium.push(driver,'cmd("'+driver+".findElement(By.id(\\"input-firstname
\\"))"+".clear()"+";",true)');
[...]
```

FIG. 8

SECURITY TESTING FRAMEWORK INCLUDING VIRTUALIZED SERVER-SIDE PLATFORM

BACKGROUND

Unless otherwise indicated herein, the approaches described in this section are not prior art to the claims in this application and are not admitted to be prior art by inclusion in this section.

Security vulnerabilities such as cross-site request forgery (CSRF) attacks occur when an attacker forces a user's web browser to perform unwanted actions on a web application in which the user has a valid session. Successful exploitation of such a CSRF attack can undesirably result in illicit money transfers, a user password reset, and/or the execution of other security-sensitive operations. It is therefore desirable to detect vulnerabilities to CSRF attacks.

SUMMARY

Embodiments provide a security testing framework for web applications. The framework includes a HTTP browser engine replaying recorded sessions to identify candidate traces indicative of attack. A mutation engine changes values in the attack candidate traces to generate additional traces posed against a virtualized server-side platform. The virtualized server-side platform creates snapshots of application state for testing, thereby avoiding permanent damage to application persistence. The virtualized server-side platform includes persistence monitoring sensors (e.g., at connectors to the database or file system) for detecting a variety of vulnerability classes, including Cross-Site Request Forgery (CSRF) and SQL injection attacks. For remote command execution attack detection, a vulnerability validation interface deployed on the server-side records strings passed to code generating application program interfaces (APIs). For possible Cross-Site Scripting (XSS) attacks, the mutation engine may detect HTTP responses for examination of generated web code, and the HTTP browser may be extended to include a vulnerability validation API that is automatically called by successfully injected attack payloads.

An embodiment of a computer-implemented method comprises receiving, by a server hosting a web application, a trace. The server creates a snapshot of a virtualized state of the web application at a time of receiving the trace. The server senses a change in persistence resulting from the trace. In response to the sensing, the server communicates the trace to a test engine for identification of a security vulnerability.

In some embodiments the sensing occurs at a file system.

In particular embodiments the sensing occurs at a database, and the security vulnerability comprises a cross-site request forgery (CSRF) vulnerability.

According to certain embodiments the sensing occurs at a database, and the security vulnerability comprises a SQL injection vulnerability.

In various embodiments the sensing comprises detecting injection of a payload of the trace, and the method further comprises issuing, by the payload, a call to an application program interface (API).

According to particular embodiments the issuing comprises issuing the call to the API residing on the server, and the security vulnerability comprises a remote command execution vulnerability.

In various embodiments the trace comprises a mutant trace having a second value changed by a mutator from a first value originally provided by a browser component, and the security vulnerability comprises a cross-site scripting (XSS) vulnerability.

Some embodiments further comprise the server generating a response to the trace, and communicating the response to the mutator.

According to various embodiments the sensing comprises detecting injection of a payload of the trace, and the method further comprises issuing, by the payload, a call to an application program interface (API) residing on the browser component.

A non-transitory computer readable storage medium embodies a computer program for performing a method comprising a server receiving hosting a web application receiving a trace, and the server creating a snapshot of a virtualized state of the web application at a time of receiving the trace. The server senses a change in persistence in a database resulting from the trace. The server communicates in response to the sensing, the trace to a test engine for identification of a security vulnerability.

An embodiment of a computer system comprises one or more processors and a software program, executable on said computer system. The software program is configured to cause a server hosting a web application to receive a trace, and to create a snapshot of a virtualized state of the web application at a time of receiving the trace. The software program is further configured to cause the server to sense a change in persistence resulting from the trace, the change in persistence comprising injecting a payload of the trace, the payload issuing a call to an application program interface (API). The software program is also configured to cause the server to communicate, in response to the sensing, the trace to a test engine for identification of a security vulnerability.

The following detailed description and accompanying drawings provide a better understanding of the nature and advantages of embodiments.

BRIEF DESCRIPTION OF THE DRAWINGS

FIG. 8 shows an excerpt of a generated UI work flow replay script according to an example.

DETAILED DESCRIPTION

Figure 1:
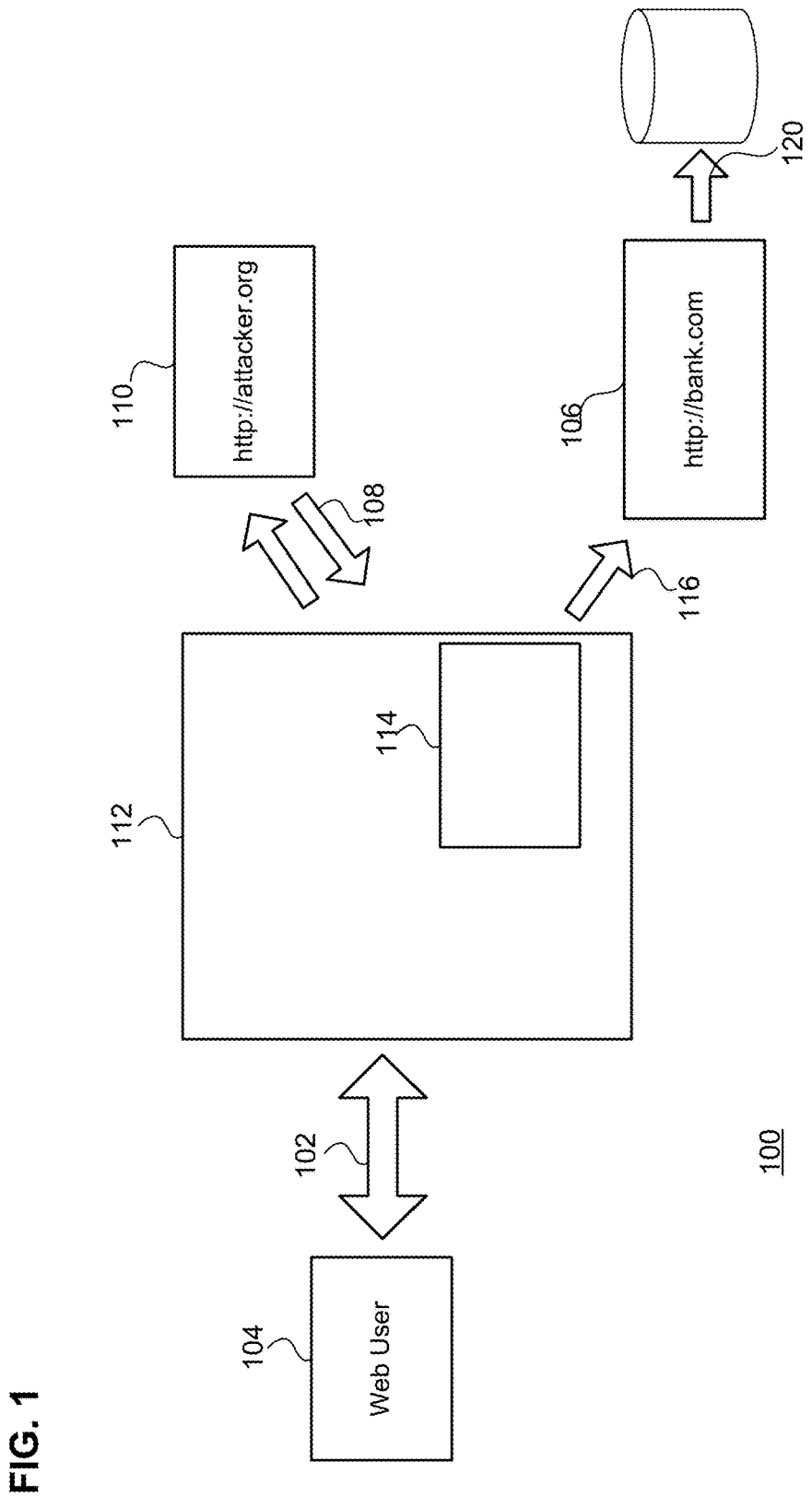
FIG. 1 is a simplified view of a CSRF attack.

Described herein are methods and apparatuses that implement detection of CSRF detection. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

The same-origin policy (SOP) of the web enforces strong origin-based isolation properties for active code in web documents. In essence, JavaScript running in the context of a given web origin is limited to interaction with content associated with this origin exclusively. However, while active code is restricted in its direct interaction with cross-origin resources, numerous ways exist to initiate cross-origin HTTP requests in a web browser, e.g., through the creation of specific HTML tags or via the recently added cross-origin capabilities of JavaScript's XMLHttpRequestobject. These HTTP requests are created within the browser's current execution context, and thus reflect its current state in respect to aspects such as network location or active authentication relations.

The term Cross-Site Request Forgery (CSRF) subsumes a class of client-side attacks against web users, that abuse cross-origin HTTP request generation to undermine the SOP's origin-based isolation. CSRF is a case of a confused deputy-type vulnerability, in which the web browser acts in the execution context of the attack's victim without explicit consent.

While specifics may vary, CSRF attacks typically follow a similar pattern.

The attack's victim navigates his web browser to a web document under the adversary's control.

Without the victim's knowledge or consent, this web document creates a cross-origin HTTP request.

This request causes a permanent state-changing operation in the context of the cross-origin target of the request which is attributed to victim.

The consequences of a CSRF attack can vary. A problematic sub-class of such attacks are attacks which abuse existing authenticated states, that are maintained via transparent measures to conduct actions under the victim's identity.

Other variants of CSRF include evidence forgery or privacy attacks, via timing, rendering or response size side-channel. These attacks do not occur due to application level CSRF vulnerabilities, but instead are a by-product of browser functionality.

In the case of a CSRF attacks on authenticated sessions, the attacked user maintains a authenticated session with the vulnerable site in his web browser, using a transparent authentication tracking mechanism, i.e., HTTP cookies, cached HTTP authentication, or a client-side certificate authenticated SSL session. Thus, attacker created requests are processed in the user's authentication context.

FIG. 1 shows a simplified view of a cross-site request forgery attack 100. At 102, the web user 104 has an active authentication context with his banking site 106 (bank.com) in the form of an authenticated cookie 107.

In this state, at 108 the web user visits a web site 110 (attacker.org) under the adversary's control. The adversary's web page contains (next to the actual content 112) a hidden iframe 114 pointing to a URL of bank.com.

This iframe creates an HTTP request 116 to bank.com. This request automatically carries the authentication cookie and is processed by the server in the authentication context of the web user.

At 120, the application logic of bank.com causes a permanent state change in the user's data due to the processing step (e.g., in the form of transferred funds or a similar malicious activity).

Using such CSRF attacks, the attacker can cause arbitrary state changes and actions under the authenticated identify of the attacked user, as long as these changes and actions can be caused by HTTP requests.

CSRF vulnerabilities may be defined in a number of ways. One definition is that the web application does not, or cannot, sufficiently verify whether a well-formed, valid, consistent request was intentionally provided by the user who submitted the request. While this definition captures the essence of the vulnerable behavior, it is abstract and difficult to test. Specifically, it is hard to map program behaviors to the notion of user intention.

Accordingly, as used herein a web application exposes a CSRF vulnerability, if it processes at least one HTTP request, that fulfill the following conditions.

1. A permanent state change is caused on the vulnerable web application due to the processing of the HTTP request.
2. This request can reliably be created by the adversary in the context of a cross-origin web page using only information that is readily available to the attacker (i.e., the request itself does not contain secrets or session-dependent nonces).
3. The state change is processed in the authentication context of the HTTP request. This authentication context is maintained using a transparent approach of authentication tracking (i.e., HTTP cookies, cached HTTP authentication credentials, or an authenticated client-side TLS connection.)

To prevent CSRF vulnerabilities, an application may actively verify that state changing actions are directly tied to the direct actions of the authenticated user. To achieve this, state changing HTTP interfaces may be guarded by anti-CSRF-nonce checkers. An anti-CSRF-nonce is a random value that is created by the server and integrated into the request data by the client, such that an attack cannot read or guess the value, to be used in his attack.

Issues arising with this protection approach may be as follows.

The developer has to integrate this protection intentionally, as the general web paradigm does offer no native protection. For this, the developer has to manually identify all code, that may cause state changes due to HTTP requests. A single omission in this process causes vulnerabilities.

Often, HTTP-caused state changes happen transparent and unknowingly to the developer, due to automatic processes or non-trivial data/execution flows. These instances are hard to spot and easy to miss in the assessment of the protection surface.

Automatic, framework-based protection is unreliable, as only the framework's standard methods for HTTP request generation can automatically be outfitted with the anti-CSRF-nonce. As soon as HTTP requests are created with other means, e.g., third party components or custom coding, framework-based protection fails.

Currently, CSRF vulnerabilities are difficult to find for existing security tools. For example unlike low-level vulnerability (such as Cross-site Scripting or SQL Injection), dynamic security testing is unlikely to discover CSRF problems through unsupervised blackbox test techniques, such as web crawling. Instead, a potential CSRF vulnerability can in most cases only be observed in the context of a non-trivial application work flow, e.g., the ordering of digital goods or the submission of syntactical correct and complete information. Thus, unsupervised, dynamic black-box testing of web applications, as offered by the current generation of security testing tools, may be insufficient to find CSRF.

Likewise, static source code analysis (SAST) may not reliably find non-trivial CSRF problems. For one, reliably detecting the dependencies between the processing of HTTP requests and specific state-changes in the persistence layer is a hard problem. Furthermore, a SAST tool can often not decide if a given state change is security relevant or even authentication dependent. Finally, custom protection mechanism such as anti-CSRF-nonces cannot be distinguished from general parameters using SAST. Thus these tools have to rely either on crude heuristics or are limited to verify that the (incomplete) framework mechanisms are activated, resulting in either false positives or false negatives.

Embodiments detect cross-site request forgery (CSRF) attacks by monitoring, mutation, and analysis of suspect requests that are received by an application server. An engine observes UI interaction, HTTP traffic, and server-side changes in order to create an initial list of CSRF candidates (e.g., HTTP requests that could indicate a CSRF vulnerability). Embodiments may feature a virtualized server-side platform including sensors deployed for application persistence monitoring. Using inter-trace analysis, these CSRF candidates are de-composed into their semantic components (e.g., parameter values and classes). By performing value mutation operations on these components and repeated replay of the resulting HTTP requests, CSRF candidates are tested to see if the underlying HTTP request could be utilized in the context of a CSRF attack. Subsequent validation and exploitability assessment may reduce the initial list of suspect candidate requests to only those exploitable cases for which a proof-of-vulnerability demonstration exploit can be created.

Figure 9:
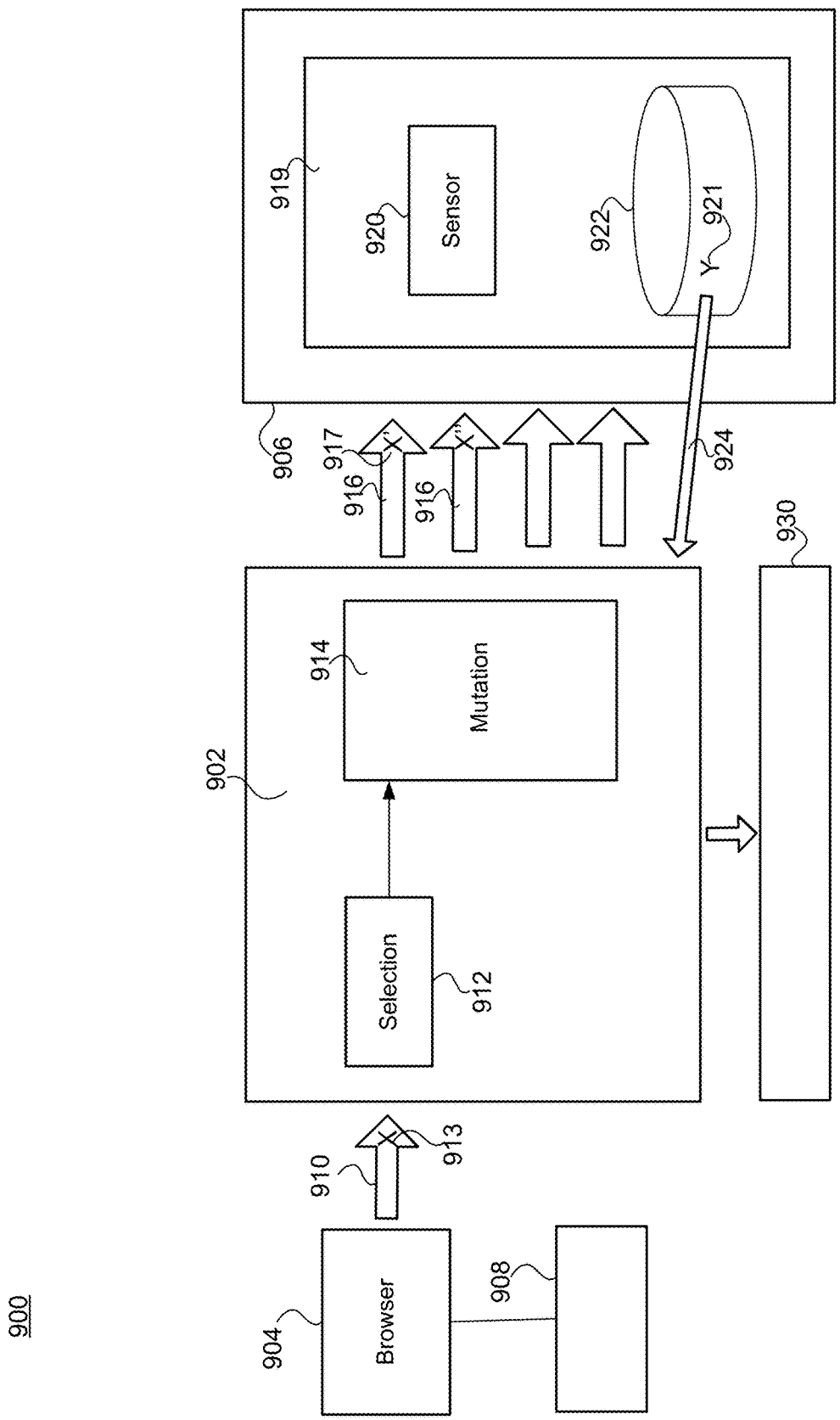
FIG. 9 shows a simplified diagram of a system according to an embodiment.

FIG. 9 shows a simplified view of a system according to an embodiment configured to implement testing of web applications for security vulnerabilities. Specifically, system 900 comprises an engine 902 interposed between a browser 904 and a server side 906.

The browser is in communication with recorded workflows 908 of user interactions with the application residing on the server side. The browser is able to replay HTTP requests 910 from those recorded workflows.

The engine is positioned to receive those HTTP requests. The engine includes a selection component 912 that is configured to analyze those HTTP requests in order to identify candidates posing the possibility of a security threat. As described extensively herein, this task may be accomplished by identifying and classifying the parameter(s) 913 of the request candidates.

The engine further comprises a mutation component 914. That component is configured to create mutants 916 of the selected candidate requests, in order to probe for security vulnerabilities. Those mutant requests may be generated by creating introducing a changed parameter 917 to the request, an activity which may be based upon parameter classification and is described in detail below.

The mutant requests are communicated from the engine to the server side. As discussed herein, the server side may comprise a virtualized server side platform that performs testing upon a virtualized snapshot in order to avoid making temporary or permanent changes to actual application server instances.

In particular, the virtualized server side platform may comprise an augmented server side 919 including a sensor 920 configured to detect changes in application state data 921 written to persistence 922. In certain embodiments the server-side may be virtualized, and the persistence may be a virtual machine snapshot. Detection of such changes in persistence data in response to received mutant requests, indicates the presence of a possible security vulnerability 924 in the web application.

That security vulnerability may be included in a report 930 communicated by the engine for display (e.g., to a security professional).

While FIG. 9 depicts a particular embodiment where a single engine performs the selecting, mutation, and reporting functions, this is not required. Alternative embodiments could feature multiple engines that are responsible for those respective tasks.

And while FIG. 9 depicts a particular embodiment featuring a separate engine located outside of a data store (e.g., outside of the recorded workflows and the application persistence), this is not required. Alternative embodiments could employ the engine implemented as the engine of an in-memory database that is used to store one or more of recorded workflows, stored parameters, generated mutants, and application state data. An example of such an in-memory database is the HANA database available from SAP SE of Walldorf, Germany.

Figure 10:
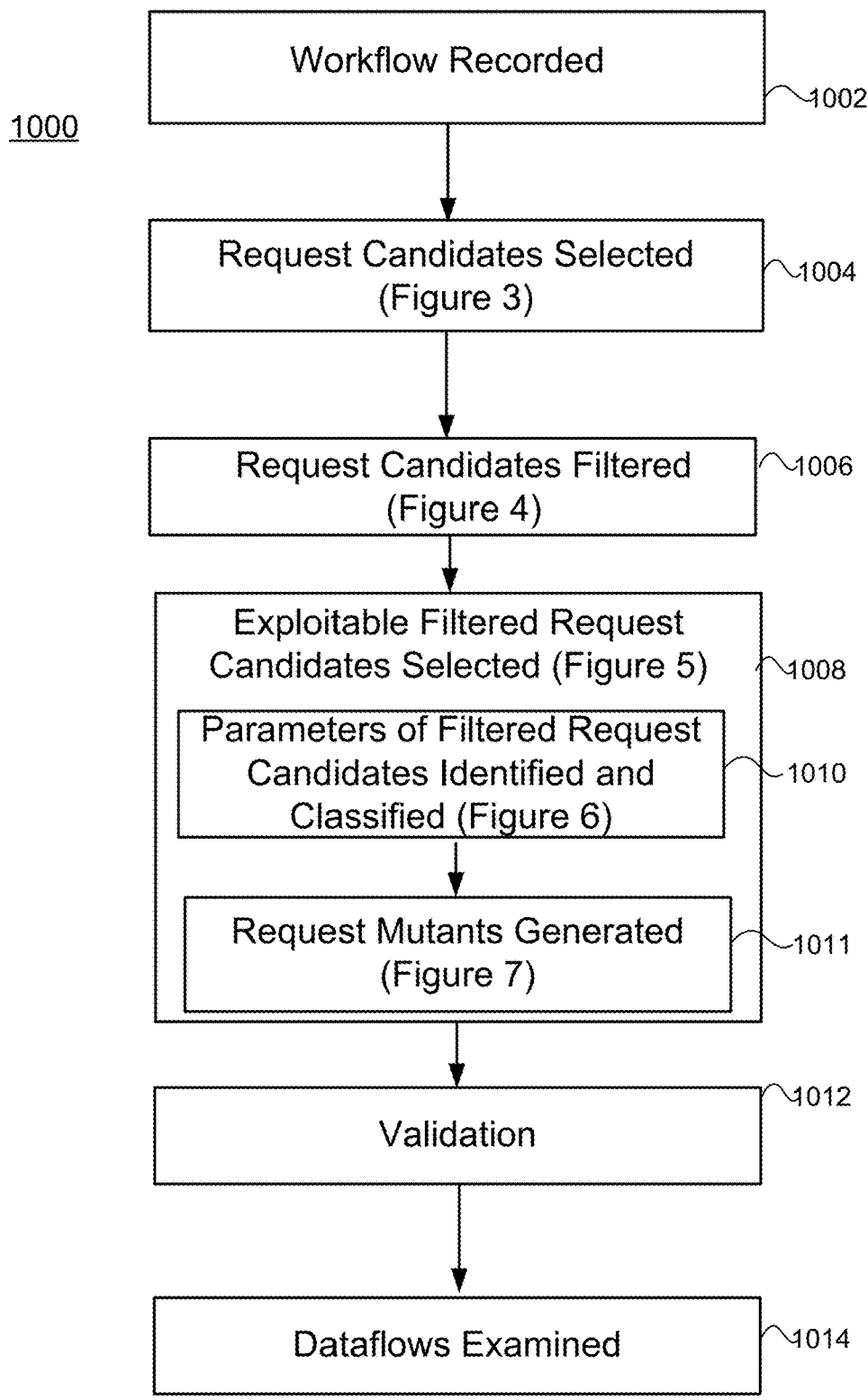
FIG. 10 shows a simplified flow diagram of a method according to an embodiment.

FIG. 10 is a simplified flow diagram showing a method 1000 according to an embodiment. At 1002, workflows with an application server are recorded, including requests received and (browser) UI interactions such as clicked buttons and entered values.

At 1004, an initial set of a list of CSRF candidates is created. This list comprises requests that correspond to a change in the application's state as revealed by sensors on the server side.

At 1006, the initial list of CSRF candidates is filtered. As described below, this filtering may involve replaying a suspect request with authentication credentials removed, in order to discern if a same changed-state result occurs.

At 1008, a further refined list of exploitable requests is created from the filtered list of CSRF candidates. As described extensively below, at 1010 this further refined list may result from identifying and classifying requests based upon their de-composed parameters. And at 1012, further potentially suspect CSRF candidates may be generated by mutation of such identified and classified request parameters.

At 1014, in a subsequent validation stage a test CSRF attack is staged and executed. If the attack succeeds, a vulnerability is successfully identified.

At 1016, in an exploitability determination stage embodiments check the dataflow to find which of the attacker's request values finally end up in the application's persistence layer.

Details of CSRF detection according to particular embodiments are now discussed. Essentially, a CSRF vulnerability allows the attacker to cause a unwanted, permanent state changing effect at the vulnerable application, via creating an HTTP request in the victim's web browser.

Thus to detect CSRF vulnerabilities, embodiments isolate HTTP requests which:

cause a permanent state changes on the vulnerable system in the authentication context of the attacked user, carry information that directly determine the side effects content, and can be created in the attacked user's web browser by the adversary without knowledge of the user's current session state.

This set of objectives directly translates into three distinct functional requirements of the detection system—the abilities to:

i) detect permanent state changes in relation to incoming HTTP requests;

ii) infer a direct data-flow relationship between the request's content and the side effect, and iii) examine the contents of HTTP requests in respect to context-less replayability.

As just mentioned, a first requirement (RQ1) is detection of permanent state changes caused by individual HTTP requests. In order to fulfill this requirement, the system deploys suitable server-side sensors which reliably record all permanent changes to the application's state. Such sensors could be placed, e.g., at the application's connectors to the database layer and the file system. As soon as a write operation to any of these connectors is detected, a link to the causing HTTP request is reconstructed.

A second requirement (RQ2) is inference of data-driven relationships between the HTTP request and the change in the application's state. To measure the potential impact of a CSRF vulnerability, it has to be established which aspects of the state change depend directly on the request's content, and thus, can be controlled by the attacker.

A third requirement (RQ3) is context-free replayability of the request. Finally, the system has to determine if an attacker is able to create the request using only information that is available to him. For example the attacker will not be able to create an HTTP request that triggers the targeted side effect, if the correct server-side processing of the request depends on parameter values that are user-session specific and unknown to the attacker (such as anti-CSRF values).

A brief overview on the set-up and execution of an application's security test is now provided. For automatic UI level application interaction, a potential CSRF vulnerability can in most cases only be observed in the context of a non-trivial application work flow, e.g., the ordering of digital goods or the submission of syntactical correct and complete information. Thus, it is necessary to train with correct application usage that covers the application's functionality. To do so, an application interaction recorder is provided which records comprehensive traces of all user-interface-level interaction with the application (i.e., all clicks on UI elements, page transitions, and all manually entered text in the appropriate HTML form elements.)

Using this recording mechanism, the tester once executes all relevant work flows offered by the application, such as login into the application or other meaningful interactions within the application's functionality scope.

These traces allow replaying all recorded actions in the context of the actual vulnerability detection procedures, observe all generated HTTP requests, and record all application state changes that are caused by the actions. This approach allows repeatable test execution for sophisticated HTTP mutation testing. This replay infrastructure may be leveraged as discussed further below.

A second component of vulnerability detection according to embodiments is a set of monitors at the application's server side, which observe changes to the permanent state of the application, such as the connected database or the file system.

Whenever the HTTP driven execution of server-side functionality causes data to be written into one of the monitored persistence components, the monitors record the this event and the written data. This allows reliably matching a given HTTP request with occurring effects to the application state.

Details of the vulnerability detection approach according to an embodiment are as follows. Using the recorded application usage traces, the system repeatedly replays the learned application interaction and uses a multi-step process to observe and mutate all relevant HTTP requests.

More precisely, the general CSRF detection approach is as follows. Candidate selection is first. Through passive monitoring of incoming HTTP traffic and occurring server-side state changes, the system determines the links between the HTTP requests and the observed application side effects, which are caused by them. This way, a set of potential CSRF candidates are generated.

A CSRF candidate is an HTTP request that directly causes state changes to the application's permanent state, if processed in the context of an authenticated user session. Such a set of CSRF candidates comprises individual HTTP requests, linked together to the resulting application state change (e.g., the change in the application's DB, which was caused by the request). In the next steps these candidate requests are iteratively analyzed and mutated to establish, if a given candidate represents indeed a real vulnerability.

A second stage comprises request analysis and parameter classification. A given candidate request is fragmented into its syntactical parts (e.g., into the individual HTTP parameters and URL components). Each of these parts is analyzed in respect to its data type, context to the current session state, and relationship to the observed application state change.

Next is request mutation and replay. The analyzed candidate request is repeatedly replayed against the application. Before each such replay operation, a selected part (e.g., HTTP parameter) is mutated. Then, using a suitable test engine, the HTTP request is sent again to the web application under test, to observe potential server-side state changes. This way, the relationship between the HTTP request's components and the state change can be inferred.

Vulnerability detection and validation then follows. For a given CSRF candidate request, the effects of all replays of the generated request mutations are recorded. Using the system's vulnerability detection procedure, it is determined if the candidate did expose a vulnerability. Then, for a last validation step, a test CSRF attack is staged and executed. If the attack succeeded, a vulnerability was successfully identified.

At the end of the process, the initial list of CSRF Candidates reduces to only the exploitable cases, for which a proof-of-vulnerability demo exploit could be created. Thus, the system produces no false positive CSRFs, a quality currently lacking in the existing landscape of security testing approaches.

Figure 2:
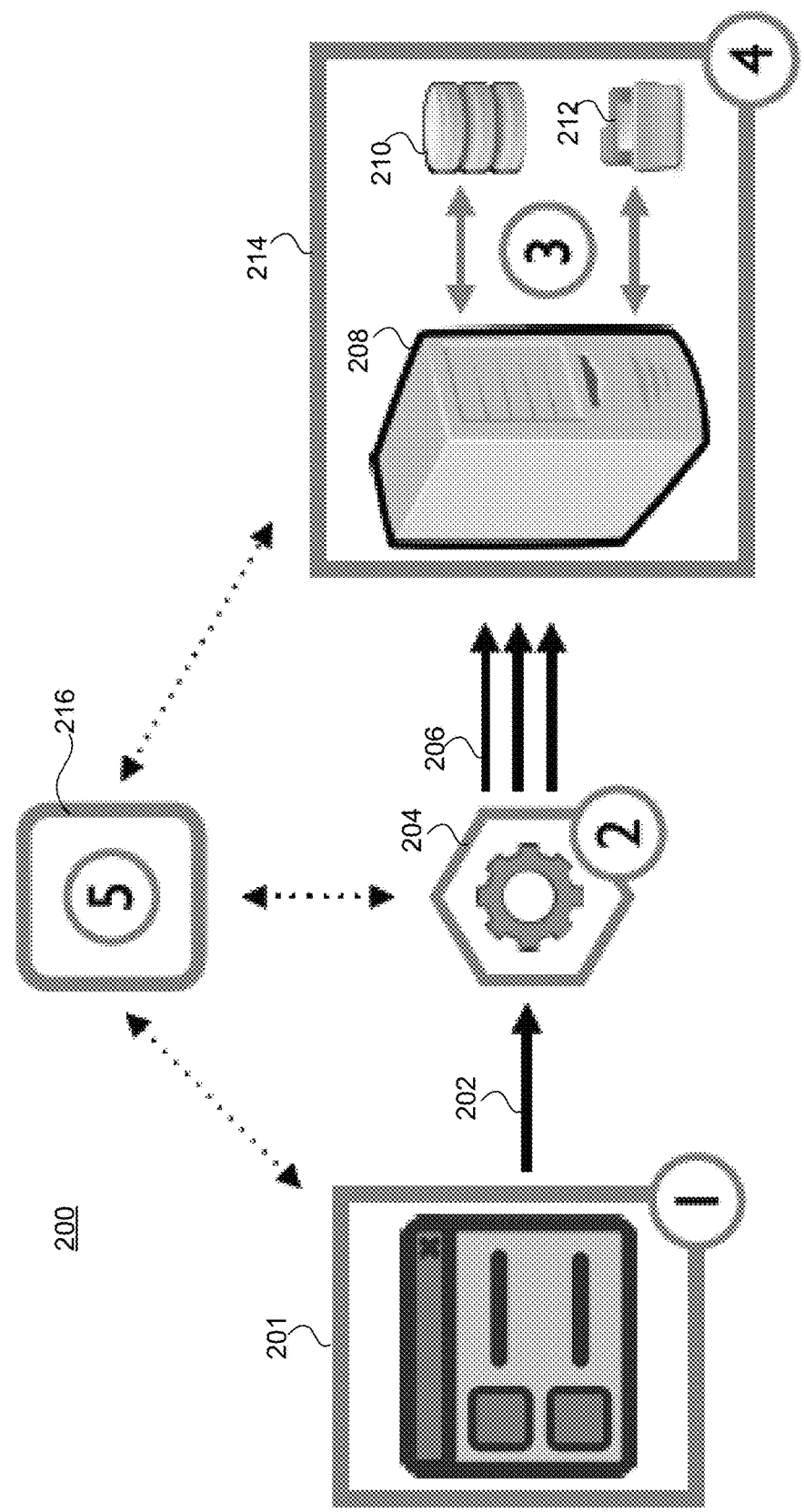
FIG. 2 illustrates components of a system according to an embodiment.

FIG. 2 shows a simplified view of a system architecture according to an embodiment. In particular, system 200 comprises (1) HTTP engine 201.

The HTTP/browser engine creates the HTTP requests 202 which will be the subject of the testing work flow. As a given HTTP request has to be received in the context of a valid usage session, the browser engine does not merely replay the CSRF candidate requests but instead simulates full usage sessions of the web application.

System 200 of FIG. 2 further comprises (2) mutation engine 204. Specifically, the request observer and mutation engine functions as an HTTP proxy positioned between the browser engine and the application's server to intercept all HTTP requests and conduct the request-mutation operations as described below to generate mutant requests 206.

System 200 of FIG. 2 also comprises (3) augmented server-side runtime 208. The core of the detection approach resides in the server-side of the application. To reliably detect server-side state changes, the application's runtime is augmented with suitable monitors at the application's connectors to its permanent storage, e.g., databases 210 and the file system 212.

System 200 of FIG. 2 further comprises (4) virtualized server-side platform 214. Specifically, the full server-side logic and storage is hosted inside a virtual machine, which allows resetting the application's state into any previously encountered version. Thus it can be ensured that none of the mutated test requests cause unwanted side effects, which might falsify the results of subsequent HTTP requests of the browser engine, such accidental termination of the web session, causing a terminal error, or logging out the test user.

System 200 of FIG. 2 also comprises (5) test engine 216. The test engine coordinates the full testing work flow. More precisely, the test engine:

starts and stops the browser engine's (1) replay of the HTTP session, controls the mutation operations of the mutation engine (2), receives the sensor data from the application's server side (3), and uses the features of the virtualized runtime (4) to reset the application state.

EXAMPLE

Particular examples are now presented in connection with FIGS. 3-8. In particular, work flow recording is now discussed.

As mentioned previously, a challenge in dynamic security testing of web applications is to reach application functionality that is only accessible if specific work flow constraints have been fulfilled.

A simple example for such an circumstance is a three step work flow (e.g., "enter order", "enter shipment details", "confirm order"), partitioned in three separate web documents, each hosting the GUI for the respective work flow step. The subsequent web document is only available if the previous interface has been interacted with correctly.

Randomized application interaction (as done by, e.g., web crawlers) will not reliably reach work flow interfaces that come after the first step, as meaningful interaction with a stateful application requires application specific knowledge.

For this reason, embodiments of the proposed vulnerability detection approach may be semi-automatic: while the actual testing and vulnerability detection work flows operate fully autonomous and unsupervised, human input is required to set up the tests. More precisely, each application work flow which is in scope the CSRF testing, may be trained into the system.

This may be done via work flow recording. Using a recording united each work flow of the application is recorded on a GUI interaction level. This allows the exact replay of the user interaction with the application and, thus, repeated generation of test HTTP requests (e.g., using the SELENIUM web testing framework).

For a given work flow, the training process may work as follows. The tester uses the interaction recording device to precisely record all interaction with the web browser, such as clicked buttons or entered values. After the tester has successfully finished the work flow, these recorded interactions are serialized in the form of a script, that is suitable for the browser engine to replicate the interaction. FIG. 8 lists an example using SELENIUM as the test driver. This testing script is used in the further vulnerability detection steps.

Each work flow may be recorded only once. Thus, a single interaction trace with the full application functionality provides full test coverage, as all portions of the application will be learned by the testing system in this manner.

After the training phase has concluded, no more manual actions from the security tester or developer are required. Further steps in the detection work flow are done automatically.

CSRF Candidate Selection may occur as follows. After all UI work flows in scope have been recorded, the selection of CSRF candidates is conducted. In this step, a precise mapping between UI interaction (e.g., the click of a button in the web interface), the HTTP request which is triggered by the request, and the server-side state change that is caused through processing the request is generated.

Figure 3:
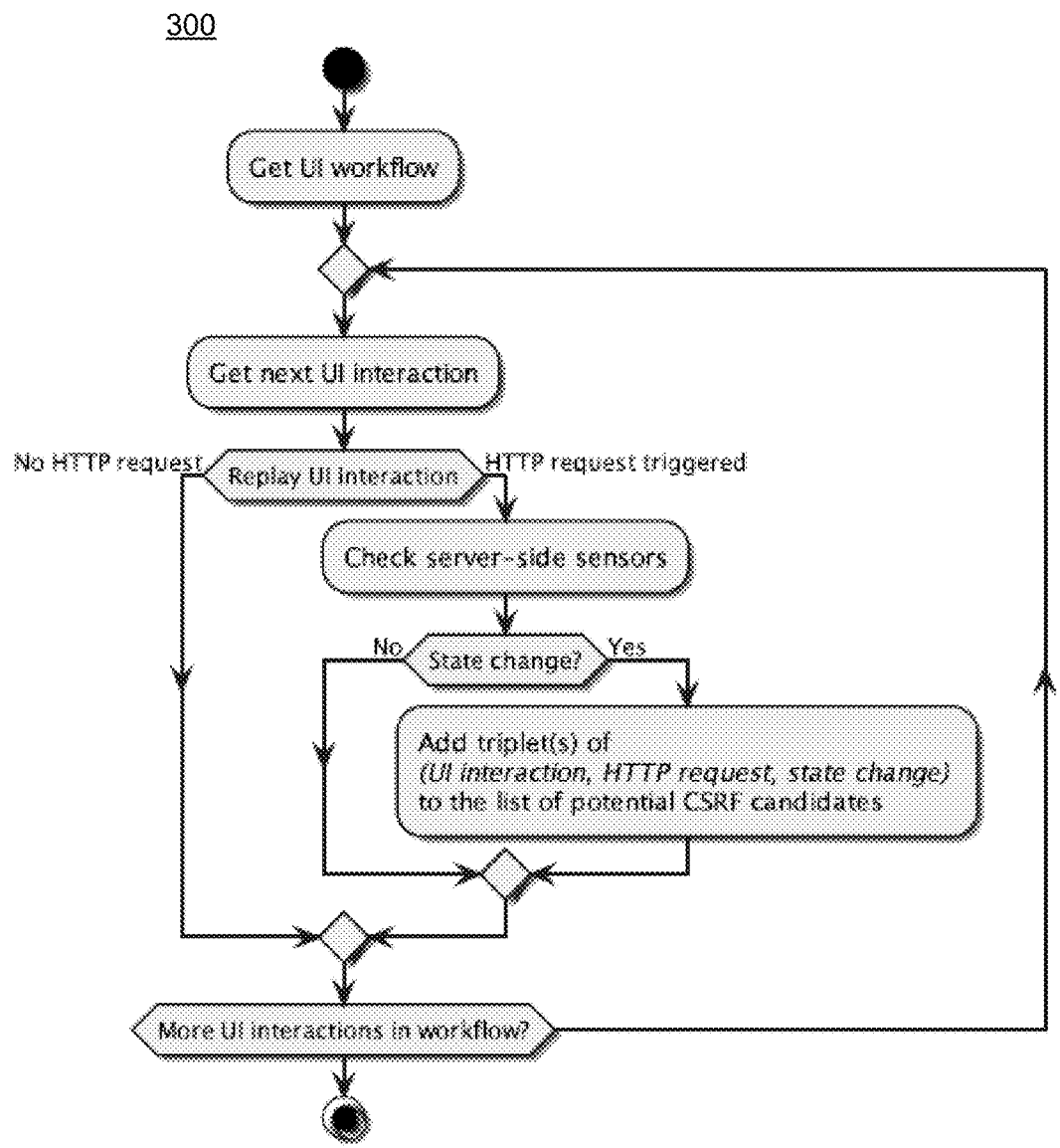
FIG. 3 is a simplified flow diagram showing CSRF candidate selection according to an embodiment.

To create this mapping, a procedure 300 as shown in FIG. 3 may be executed. The UI interaction is replayed. For a given recorded UI work flow, the individual UI interaction elements are replayed sequentially in the browser engine. After each replayed UI interaction step, it is checked if an HTTP request was triggered.

It is noted that not all UI interactions result in an HTTP request. For instance, the entering of textual information into an HTML input-field will not cause HTTP traffic in most cases.

If an HTTP request was triggered, the link between the request and the last conducted UI interaction is recorded. The server-side sensors (which monitor the application's persistent state) are then queried. If the processing of the HTTP request caused changes to the application's state, the triplet of (UI interaction, HTTP request, state change) is added to the list of potential CSRF candidates.

If more than one independent state change was observed (e.g., one concerning the file system and one affecting the application's database), a triplet for each of these instances is created. This is necessary as a given request could trigger both security sensitive functionality (such as changing a password), and non-sensitive (such as request logging).

The list of potential CSRF Candidates resulting from the candidate selection process procedure, is then subject to the actual vulnerability detection process, which is now described.

Particular embodiments may employ virtual machine (VM)-driven testing. That is, testing for effects of HTTP requests (in general) and automatically detecting CSRF (in specific), requires the creation of numerous HTTP requests that are sent to the application under test.

However as CSRF is a vulnerability that interacts with a stateful system, such requests can permanently alter the server-side state of the application. For example consider a shopping application.

To test for a CSRF vulnerability in the final step in a shopping work flow (the "submit shopping basket" step), the testing tool has to create requests that submit the order. Depending on the request and the server-side logic, such a request could permanently alter the shopping basket's state in such a fashion that all further requests concerning this specific shopping order and this step in the work flow will fail, as the process has already been marked as "finished". This in turn renders the overall testing file effort incomplete, as not all test requests can be evaluated.

To avoid such unwanted side effects of test requests, embodiments may encapsulate the application's server-side inside a virtual machine (VM). This in turn allows the embodiment to set VM snapshots at any time of the testing process, persisting the server-side state at the given moment.

This allows the following procedure, whenever the test requires more than one request to be sent for a given application state.
1. Before a potentially state changing HTTP request is sent to the application, embodiments creates a VM snapshot.
2. The request is sent to the application and potential server-side effects are recorded by the server-side sensors.
3. If more requests for this specific step exist, embodiments reset the application to the created VM snapshot, effectively removing all state changes and side effects of the previous request.
This process is the basis of the test procedures below.

Filtering of CSRF candidates is now described. The result of the process described above is a comprehensive list of CSRF candidates, i.e., HTTP requests that cause server-side state changes.

However, server-side state changes do not necessarily depend on the authentication state of the user/request. For instance, many logging mechanisms always trigger if a request is processed, regardless of its authentication context.

Thus, a necessary requirement for a CSRF vulnerability is that the observed state change is related to the authentication context of the attack's victim. For this reason, embodiments may examine if a state changing action indeed depends on the authentication context of the victim.

Figure 4:
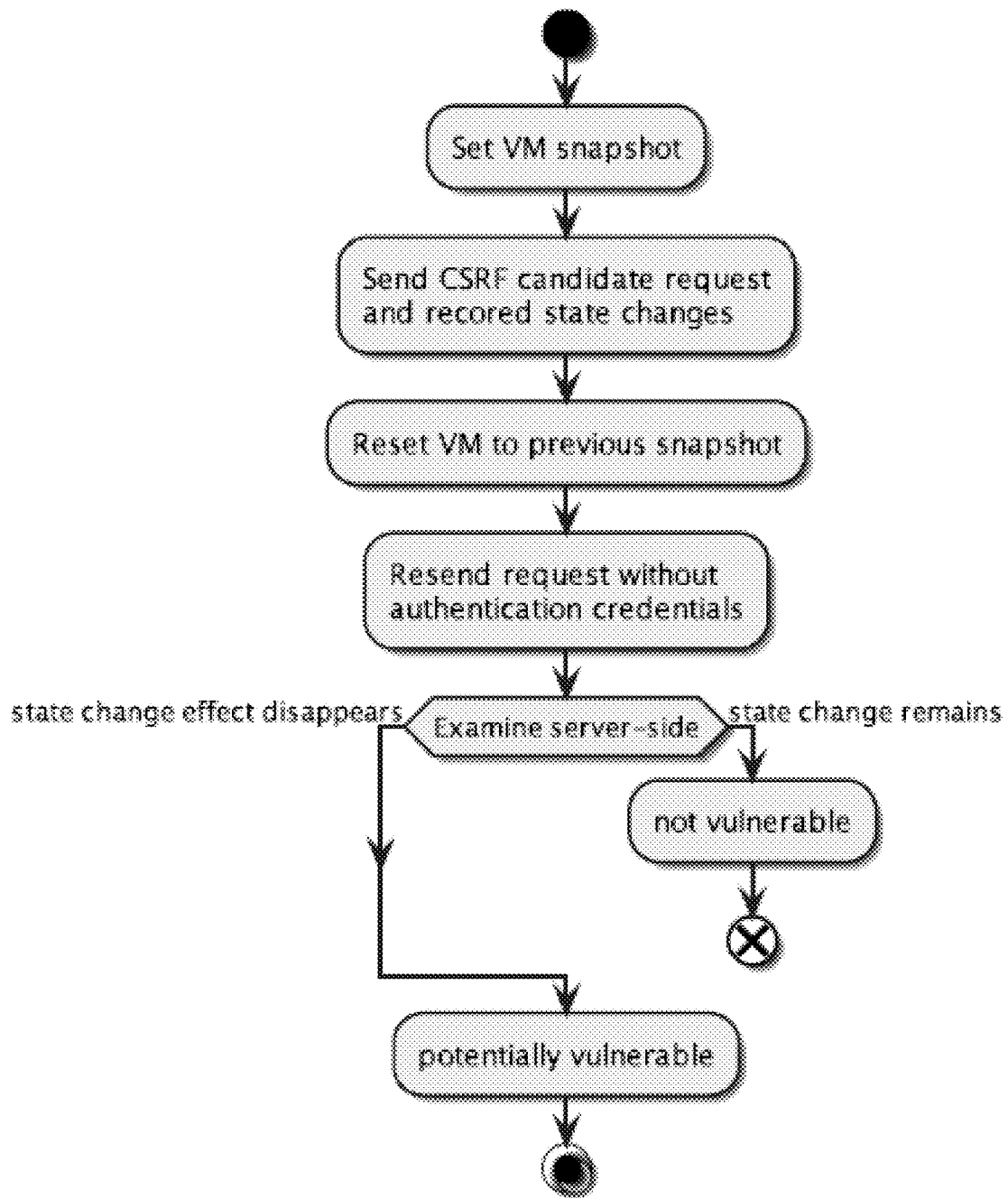
FIG. 4 is a simplified flow diagram showing checking if a given state change is tied to authentication state, according to an embodiment.

Embodiments verify the state change's dependence on an authentication context as shown in the flow diagram 400 of FIG. 4. In particular, embodiments replay the full recorded work flow.

As indicated in the flow diagram of FIG. 4, whenever a CSRF candidate is reached in this process, the request is sent twice.
1. The system sets a VM snapshot.
2. The CSRF candidate request is created normally and sent to the application. All server-side effects are recorded.
3. The VM snapshot is restored to the previously recorded state.
4. The candidate request is replayed. This time all authentication credentials (such as HTTP Authorization or Cookies headers are removed) before the data is sent to the application's server-side.

If the same state change can be observed for the authentication-less request (i.e., the effect of the request does not rely on the authentication context), embodiments remove the request from the list of potential CSRF candidates.

Figure 5:
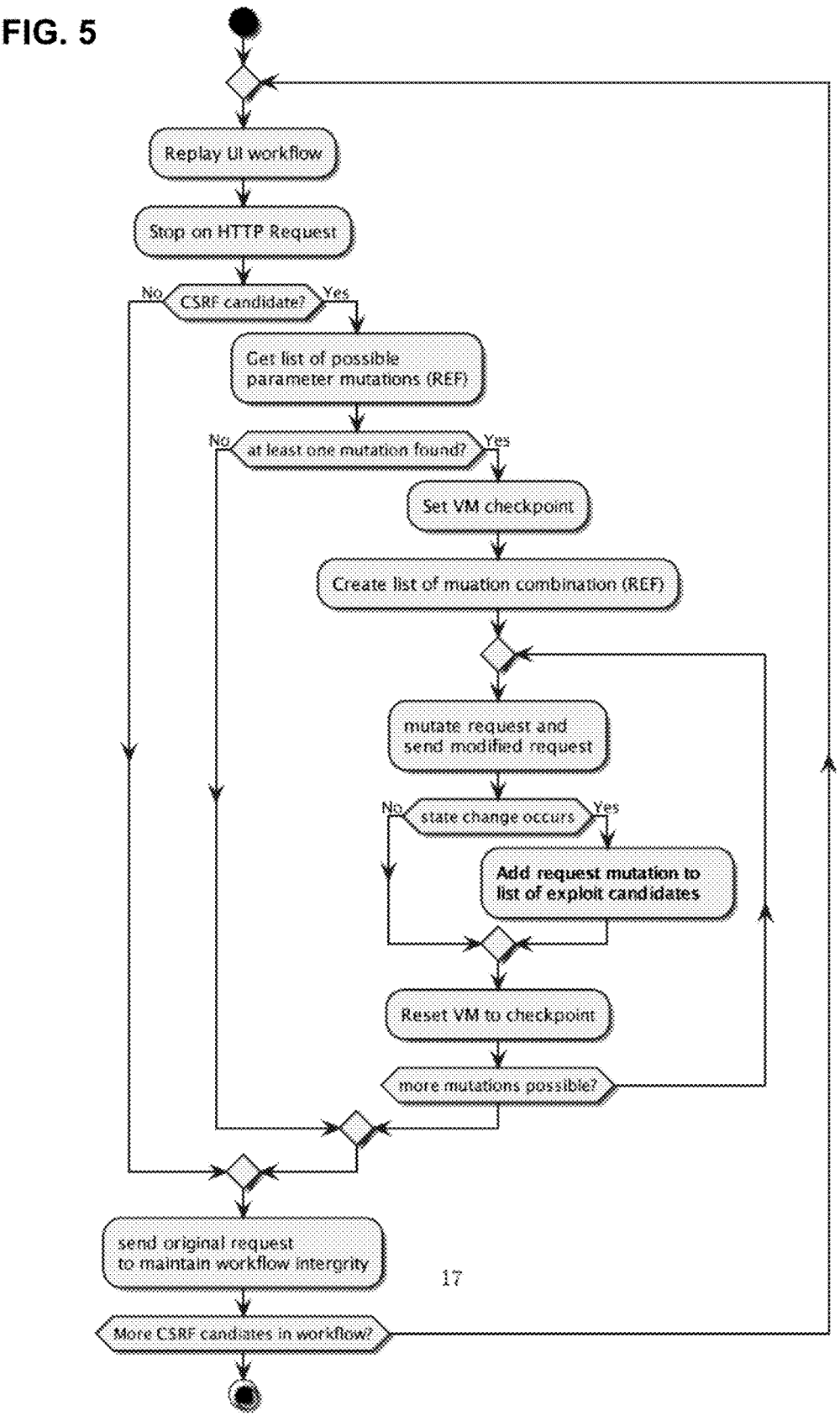
FIG. 5 is a simplified flow diagram showing exploitable candidate selection according to an embodiment.

Detection of vulnerabilities through request mutation is now described. Using the list of filtered potential CSRF candidates from the previous work flow step, a final list of exploitable vulnerability candidates is generated as shown in FIG. 5.

To do so, the recorded UI work flows are executed against the application again. For each generated HTTP request, embodiments check if the request is in the list of CSRF candidates. If this is the case, the following process is executed.

1. Before a test request is send to the application's server-side, a VM check-point is set by the test engine. This allows to reliably maintain the server-side state integrity, through reverting to the checkpoint after the request has been send and evaluated. If this measure was not in place, the processing of the test requests could lead erroneous states of the application's server-side, which would falsify the results of the subsequent tests.

2. For every parameter found in the request, a list of all viable mutations is generated. In this context, a viable mutation is a modification of the parameter's value that can be conducted by the attacker. Details regarding the process of parameter extraction and value classification, on which the creation of mutated values is based, are provided below.

3. If the at least one viable mutation exists, a list of all possible mutations is created. For this, one of two strategies can be chosen.

One strategy is individual parameter testing. Here for each possible mutation operation in every identified parameter, a test request is created and added to the list.

Another strategy is full testing. Here, the scalar product of all feasible mutations is generated. For instance, if two possible mutations for parameter A and three possible mutations for parameter B were found, a total set of 6 mutations can be tested.

It is noted that fully testing the scalar product is only required where complete coverage is desired. Hence, this might be omitted in the initial test run for reasons of complexity and timing.

4. The test request is sent and the server-side sensors and examined to see if a state change can be observed that is related to the original change which has been previously recorded in connection to the CSRF candidate.

Each of the HTTP requests that cause a state change after the final parameter mutation step, is considered to be an exploitable candidate and is passed to the vulnerability validation step (now described below).

As a next step, embodiments determine whether the found vulnerability candidates are indeed exploitable by an attacker in productive use. For this validation a realistic attack scenario as shown below, is automatically replicated.
1. A fresh virtualized application is spawned in the VM-based runtime and a fresh web browser instance.
2. Embodiments create a valid, authenticated session for the victim user, using a recorded authentication trace as described above and reusing UI traces from the previous steps.
3. The test browser opens a second browser tab. In this tab an attacker web page (following the example of FIG. 1) is accessed. In this web page, a cross-origin request to the web application under test is created (e.g., via a hidden iframe). The target of this request is exactly the vulnerability candidate URL as created during the previous steps.
4. Embodiments query the server-side sensors if the targeted state change has occurred. If this is the case, embodiments have validated that the candidate is indeed exploitable.

Due to this realistic reproduction of an actual attack, alerts provided by embodiments are free of false positives. This is because a proof of exploitability has been given.

For validated vulnerabilities, embodiments examine the occurring data flows. That is, embodiments check which of the attacker's request values finally end up in the application's persistence layer. Details on this aspect are provided later below.

Specific details regarding various procedures employed for vulnerability detection according to embodiments, are now provided. Regarding parameter classification through request inference, the vulnerability detection approach adopted by embodiments relies on mutations of an HTTP request's parameter values. Identification of the suitable parameters of a request, and how the set of viable value mutations is generated, are described below.

In theory, HTTP requests in general and HTTP URLs in specific offer a clean syntactical structure that allows straight forward interpretation and segmentation. The URL's path identifies the server-side functionality, which is addressed and the request's GET and POST parameters contain the data that is passed to the server to execute the targeted functionality.

However in practice the server-side processing of HTTP requests is realized with a high degree of flexibility. Especially, strictly following the URL structure is insufficient. Some techniques potentially mask request parameters as part of the URL's path.

Furthermore server-side functionality exists that utilizes HTTP GET parameters to identify the server-side functionality (e.g, in the form of http://host.com?fun=signup), effectively using parameters with path semantics.

Thus, analyzing a single HTTP request is not sufficient to reliably dissect the request into its components. Instead, embodiments utilize the data-flow approximation and inter-trace analysis to identify and classify request parameters.

Data-flow approximation is now discussed. In the context of CSRF, data-flows from HTTP requests into the persistent server-side state are of high relevance. Embodiments aim to identify such data-flows through request/effect matching.

The HTTP request is divided into syntactical tokens in the same fashion that a server-side HTTP parser processes the incoming request. Then, the system compares the string representations of the extracted tokens (e.g., GET parameter values or URL component) with the state changes that have been observed in the context of the request. If a direct match is found, the corresponding part in the HTTP request is flagged to be a potential parameter and included in the subsequent mutation tests.

Inter-trace analysis is now discussed. Embodiments may employ a differential approach, which utilizes several distinct HTTP traces. In this context, the term HTTP trace describes a sequence of HTTP requests that have been recorded during the execution of a recorded work flow. Thanks to the architecture of particular embodiments (see, e.g., FIG. 2), it is possible to replay the same work flow multiple times against the application's server-side. This, in turn, allows the direct comparison of matching HTTP requests that have been created on a given step in the work flow. Thus sub-components that differ for the corresponding requests in separate traces can be safely interpreted as a request parameter.

Parameter classification according to embodiments is now discussed. To determine potential value mutations for the found request parameters, the nature and datatype of the parameter and its value are to be identified. The parameter value's datatype is determined through a simple type sniffing approach, based on a sequence of regular expression-based tests.

Figure 6:
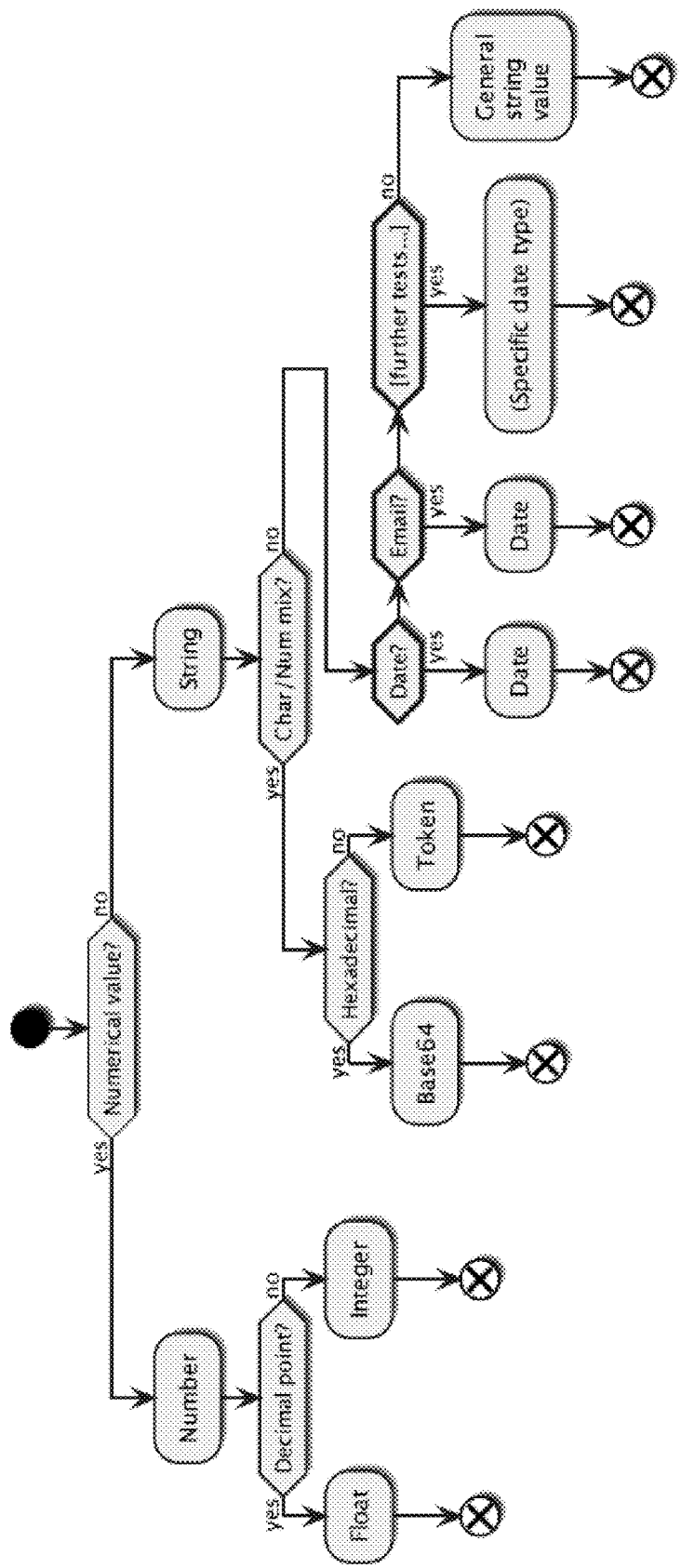
FIG. 6 is a simplified flow diagram showing the determination of datatypes of parameter values.

FIG. 6 provides a simplified flow diagram of such an approach to determining datatypes of parameter values according to a particular embodiment. In this process the value type is repeatedly refined, starting with coarse classifications into numerical or string values but to precisely defined syntactical constructs, such as email addresses.

Classification of request parameter according to an application specific role is now discussed. Specifically, apart from a value's datatype, a parameter can also depend on work flow specific conditions, which can potentially indicate the parameter's significance and role within the work flow. For this, embodiments may assign each identified parameters to one of the following classes.

One class of identified parameter is request-depended. The value of this parameter changes for each request and possibly tied to the request on the server-side. Examples of parameters in this class include Random nonces or Anti-CSRF tokens.

Another class of identified parameter is session-depended. The values of this parameter class are fixed for a given session and changes whenever a fresh session is started (e.g., after a re-login of the user). An example of this parameter class is Session ID used as a parameter value.

Still another class of identified parameter is user-depended. The value of this parameter is tied to the logged-in user. An example is UserID used as a parameter value.

Yet another class of identified parameter is input-depended. The value of this parameter is determined during application usage and often depends on the user interaction. One example of this class of parameter is manually entered form data.

Another class of parameter is: static. Here there are no syntactical values in the request that don't change.

To perform this parameter classification, embodiments again use inter-trace analysis. In total, four (4) HTTP traces of the same work flow are recorded. These are two (2) traces that conduct the work flow in the context of the same authenticated session; one (1) trace that runs the work flow for the same user but with a fresh session; and finally, one (1) trace in which the work flow is run under the authentication context of a second user.

As preliminary activities, in order to be able to generate the four traces, two user accounts (e.g., USER1 and USER2) are set-up in the application under test. Furthermore, embodiments are outfitted with the following:

two sets of login credentials (i.e., username and password), for USER1 and USER2 respectively;
a work flow recording of the login procedure (WF-LI), recorded using the credentials of USER1;
a work flow recording of the logout procedure (WF-LO); and
a work flow recording of the work flow under test (WF-T).

According to embodiments, the HTTP engine (e.g., as shown in FIG. 2) is able to login either user using the provided credentials and string substitution in WF-LI. To authenticate USER2, the string values of username and password of USER1 are replaced in the recorded work flow with the matching values of USER2.

A procedure for parameter classification is as follows. Using the recorded work flows, the collection of the four traces is performed as follows.
1. Run the login work flow WF-LI with the first set of credentials, creating an authenticated session for USER1.
2. Run the test work flow WF-T and record trace 1.
3. Rerun the test work flow WF-T in the same session and record trace 2.
4. Run the logout work flow WF-LO to terminate the authenticated session. Delete all local cookies from the browser engine.

5. Re-authenticate USER1 with WF-LI to start a fresh session.
6. Rerun the test work flow WF-T and record trace 3.
7. Logout USER1 with WF-LO and delete all cookies.
8. Run WF-LI to authenticate user 2 with the second set of credentials.
9. Run WF-T in USER2's authentication context and record trace 4.

Comparing the corresponding HTTP requests in the four traces now allows a reliable classification of the parameter values, according to the introduced classification scheme.

A parameter is classified as request-depended if the value of this parameter is different in all four traces.

A parameter is classified as session-depended if the value of this parameter is identical in traces 1 and 2, but different in traces 2 and 3.

A parameter is classified as user-depended if the value of this parameter is identical in traces 1, 2, and 3, but different in trace 4.

A parameter is classified as general if the value of this parameter is identical all four traces.

Using this classification, it can be deduced which request parameters are known to the attacker, which request parameters are unavailable, and which request parameters have to be guessed.

The mutation of parameters according to embodiments is now discussed. For each parameter which carries a value that is unknown to the attacker, the following mutations are attempted.
1. The value is removed completely. The test is successful if the targeted state change remains untouched, as this shows that the value is not needed for a practical attack.
2. A random value of appropriate data type is chosen. The parameter is exchanged with a random value of matching datatype (e.g., according to the type inference process discussed in connection with FIG. 6). The test is successful if the targeted state change remains untouched, as this shows that the value can be set by the attacker.
3. A value is transferred from another user's session. The parameter value is exchanged with the matching value obtained from a usage session that has been executed with a different set of authentication credentials. The test is successful if the targeted state change remains untouched, as this indicates the value is not tied to the attacked user and thus can be obtained by the attacker.

Figure 7:
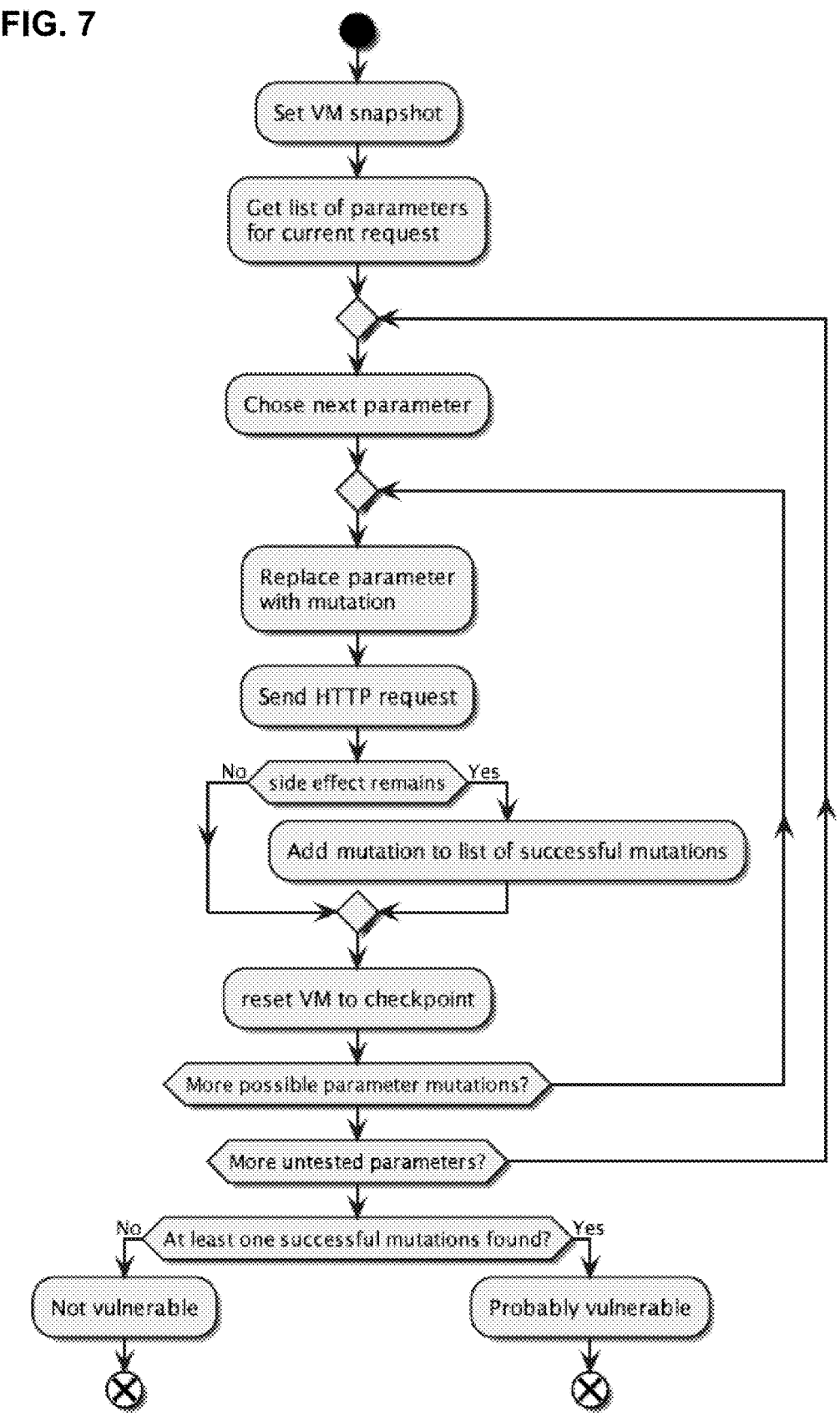
FIG. 7 is a simplified flow diagram showing mutation of request parameters according to an embodiment.

As long as one of the mutations results in a successful test, the tested parameter is marked as vulnerable. FIG. 7 shows a simplified flow diagram providing an overview of request parameter mutation according to embodiments.

If all parameters of a given request are marked vulnerable during testing, embodiments conclude that the tested interface is with a high probability vulnerable. Embodiments then may generate a combined exploitable candidate through creating a request in which all parameters are mutated according to the overview above. This exploitable candidate is passed to the vulnerability validation step discussed above.

The inference of dataflow relationship between the HTTP request and the application side effect is now discussed. While the mere existence of a CSRF problem is an interesting fact, the specifics on the attacker's ability are needed to assess the severity of the identified security flaw. For this, data collected according to embodiments can be used to examine the state changes on the server-side, which an adversary can trigger. More precisely, embodiments can distinguish between at least three classes of request/effect relationships:

One possible relationship between HTTP request and application side effect is no dataflow. Here the values of the HTTP request determine if the side effect occurs but do not influence the written values.

Another possible relationship between HTTP request and application side effect is direct dataflow. Here, values from the HTTP request occur verbatim in the side effect's write operation. For example, the value of an HTTP parameter is written directly into the database.

Still another possible relationship between HTTP request and application side effect is indirect dataflow. Here, values from the HTTP request are used in a server-side transformative process. The outcome of the process is persisted through the side effect. For example, a value of an HTTP parameter is used in a dictionary look-up, the result of this look-up is written into the database.

Using this information, the tester can prioritize the findings and plan defensive measures accordingly.

Practical implementation of certain aspects of CSRF vulnerability detection according to embodiments, is now discussed. This practical implementation focuses on particular details while omitting basic engineering tasks.

For a test-recorder, according to certain implementations the test traces are recorded using an actual, specifically prepared browser. The test-recorder set-up comprises two components: initiator and web browser extension.

The initiator is a script that launches the web browser which will be used to record the usage trace. The script sets the dimensions of the browser window precisely to the values expected by the test-driver component. Furthermore, the script ensures, that the browser is started with a blank profile and cache, to reduce unwanted side effects, and with the recorder extension (see below) active.

The web browser extension records the full user interaction with the application. For this, it monitors keyboard inputs as well as mouse movements and clicks. Whenever a given user interaction causes an event within the web page (such as the triggering of JavaScript functionality) this is recorded as well. The tester uses extension provided browser-level user interface elements to start and stop recording a work flow. After the recording has finished, it is possible to name the work flow for later easy selection.

The test-recorder exports the recorded usage trace in the form of a text-based script, containing all user-interactions, for consumption of the test-driver. While the specific encoding format is implementation specific, one possible embodiment utilizes the script notation from SELENIUM shown in FIG. 8.

Practical implementation of the test-engine is now discussed. As described previously, the test-engine coordinates and synchronizes the system components that are active during a test-run, namely the test-driver, the request-mutator, the virtualized application runtime, and the persistence monitors. To do so, the test-engine may control these components using REST HTTP interfaces.

The same interface may be used to query the state and analysis results from the components. In one particular implementation according to a specific embodiment, a Node.js1 server is used to implement the functionality.

Practical implementation of the test-driver according to specific embodiments is now discussed. Based on established web drivers (such as SELENIUM), the test-driver uses the recorded traces to exactly replicate the user interactions in a freshly spawned browser instance. The interaction trace is passed to the driver-engine by the test-engine via the driver's REST interface. Instead of autonomously running the trace, the driver halts after each created HTTP request and waits for a signal of the test-engine to continue the trace execution, again realized through a REST endpoint.

Practical implementation of the request-mutator according to specific embodiments is now discussed. The request-mutator is implemented in the form of a HTTP proxy, with an additional REST control interface, to be used by the test-engine. In one embodiment a Python-based implementation was used.

Practical implementation of the virtualized application runtime according to particular embodiments is now discussed. In general, most of the available virtualization solutions can be used in the context of the system. A technical requirement is that VM snapshots can be created and restored using automated processes. Thus the selection of technology may depend on already established deployed solutions. A particular implementation utilized a VirtualBox2. To connect the VM runtime to the Test-engine, a small HTTP REST server (again using Node.js) may be installed alongside the VM engine.

Practical implementation of persistence monitors (sensors) according to certain embodiments is now discussed. Depending on the specifics of the application under test, the implementation of the persistence monitors can vary. In general, four distinct implementation strategies may exist.

One implementation strategy is API instrumentation. Within the application server, the interface to the database, file-system, or other persistence mechanism is realized in the form of APIs. Thus, through wrapping/extending/instrumenting these APIs, an automatism can be introduced, which pushes all relevant state changes to the Test-engine (via the engine's REST interface).

Another implementation strategy utilizes an application proxy. Specifically, an application proxy component between the application logic and the persistence mechanism can be integrated in the set up. For example where SQL databases are used to store the application's data, SLQ proxies (such as MySQL-Proxy3) can be used.

Still another implementation strategy features direct integration into the persistence mechanism. Here, the sensors could be integrated directly into the persistence mechanism (e.g., into the database). In this case, the database itself realizes the monitor and notifies the test-engine of all relevant state changes. An engine of an in-memory database according to an embodiment may be particularly well-suited for this approach.

Another implementation strategy utilizes log file extraction. Here, where the persistence mechanism maintains log files of sufficient expressiveness, the state changes can also be obtained via regular parsing and analysis of these logs. This mechanism (if feasible) may be the least intrusive.

A variety of application and deployment scenarios are possible. In particular, embodiments are versatile in respect to its potential usage scenarios. The majority of the components are application-independent and easy to integrate into various set-ups. Only the persistence monitors may require specific attention.

One interesting deployment and usage scenario is as a self-standing tool. Such embodiments could be productized as a self-standing security testing tool for internal use, for customers/partners, or for general third parties. In this scenario, only the persistence monitors are adapted to support the tested application's setup (e.g., through a selection of pre-implemented application level proxies or log file extractors).

Another possible scenario is integration into an integrated development environment (IDE). Here, embodiments also could be incorporated into an IDE such as Eclipse4 or SAP's WebIDE5. In this case, the Persistence Monitors can be directly realized through transparent API instrumentation of test deployments.

Still another possible deployment and usage scenario may involve transparent security validation during nightly regression testing. Professional GUI regression testing is already in frequent use at various companies. This testing approach already utilizes web drivers (such as Selenium) to control and execute the tests. Thus an integration of embodiments may be straightforward, as applicable Test-recorders and Test-drivers are already in place. Such embodiments could use the traces of the regression testing directly to check the application for CSRF vulnerability candidates.

Yet another possible deployment and usage scenario is as a security testing service for PaaS cloud offerings. Cloud computing offering of the Platform-as-a-Service (PaaS) family (such as Microsoft's AZURE, Google's APPENGINE, or SAP's HANA CLOUD PLATFOR (HCP), offer customers a comprehensive execution environment, which included application server functionality and data persistence. Thus core components of embodiments (i.e., the Test-driver, Request-mutator, and Persistence Monitors), can be directly integrated into the offering. As virtualization is already essential for the foundational technique of PaaS services, this technical requirement is fulfilled automatically. Hence, PaaS security testing service using embodiments as described herein may only call for the customer to submit simple application usage traces, while the rest of the testing procedure is executed as part of the cloud platform's offering.

The specific embodiments that are described above are provided for purposes of illustration only, and embodiments are not limited to them. For example, in certain embodiments one or more functions performed by various components (e.g., test engine, sensor, request-mutator) may be implemented by a database engine, for example as present in an in-memory database. One example of such an in-memory database engine is that of the HANA in-memory database available from SAP SE of Walldorf, Germany.

According to particular embodiments, the processing power available to an in-memory database engine may be leveraged to perform one or more aspects as have been described herein. As mentioned above, the in-memory database engine may be employed as a sensor to monitor persistent storage by the application indicative of a CSRF. Alternatively or in conjunction with such an approach, an in-memory database engine could be used to perform request candidate selection, request candidate filtering, request mutation, and other functions.

Figure 11:
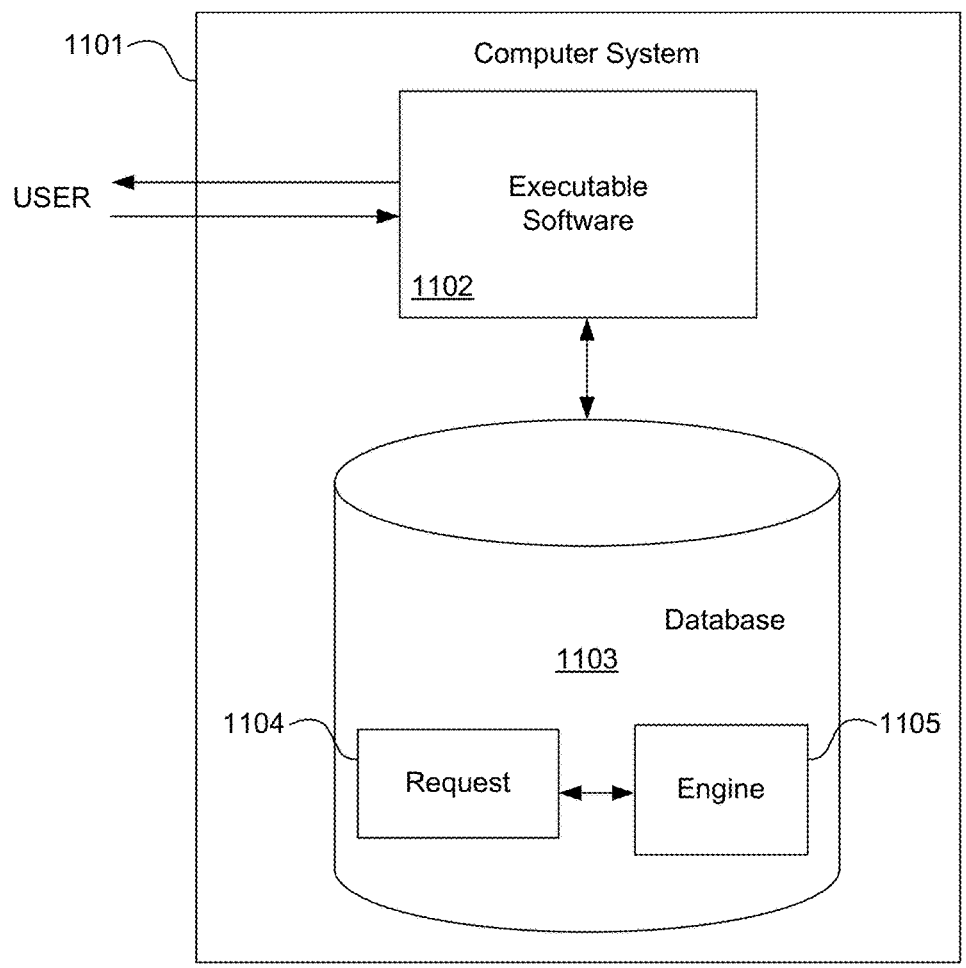
FIG. 11 illustrates hardware of a special purpose computing machine according to an embodiment that is configured to perform vulnerability detection.

FIG. 11 illustrates hardware of a special purpose computing machine configured to implement vulnerability detection according to an embodiment. In particular, computer system 1101 comprises a processor 1102 that is in electronic communication with a non-transitory computer-readable storage medium comprising a database 1103. This computer-readable storage medium has stored thereon code 1105 corresponding to an engine. Code 504 corresponds to a request. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
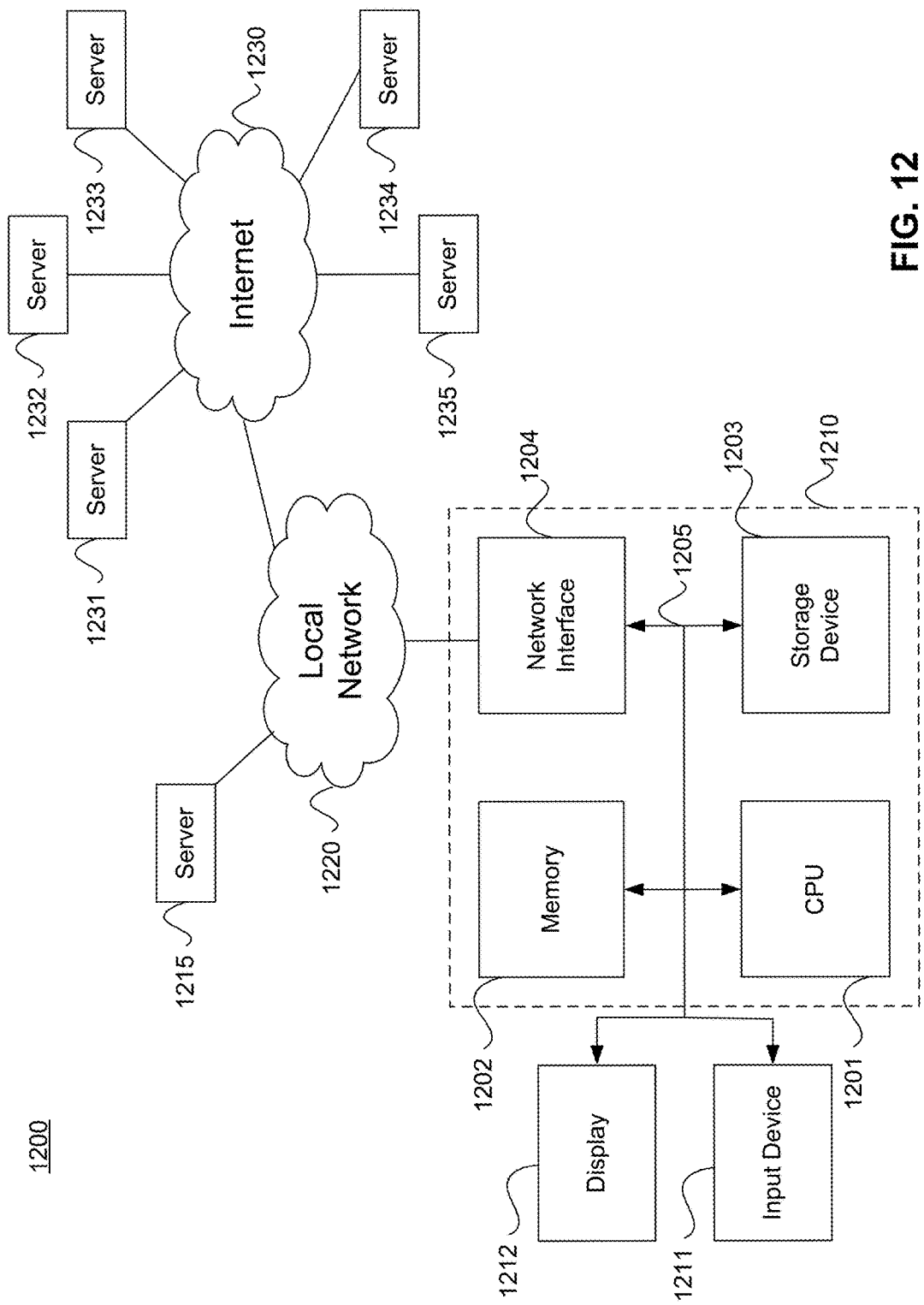
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 610 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

While the previous discussion has focused upon the detection of a specific type of security vulnerability (e.g., CSRF vulnerability), a testing framework according to embodiments may also be leveraged to detect a range of different security issues.

A generalized security testing framework according to embodiments, may be understood by returning to the system of FIG. 2. In particular, that diagram shows the following components: test engine 216, HTTP engine 201, mutation engine 204, virtualized server-side platform 214, and augmented server-side 208.

The test engine controls the HTTP engine, the mutation engine, and the virtualized server-side platform. The test engine receives results from all components, and sets and restores VM checkpoints of the virtualized server-side platform. The test engine receives all partial results and conducts the security assessment.

The HTTP engine runs the recorded application traces, using a browser engine.

The mutation engine intercepts the HTTP engine's HTTP requests, and creates multiple versions of each interesting request. The mutation engine sends these requests to the application under test (triggered by the test engine), intercepts the HTTP response, analyses the response, and forwards the results to the test engine. In this context a HTTP request is labeled as interesting if it might trigger server-side behavior which in turn provides evidence for security problems. Depending on the targeted class of vulnerabilities, the set of interesting HTTP requests can differ.

The virtualized server-side platform encapsulates the augmented server side. The virtualized server-side platform allows persisting and restoring of any application via VM checkpoints.

The augmented server-side comprises a server-side application server that runs the actual application under test. All relevant interfaces and APIs are instrumented to record security-sensitive application behavior, to be forwarded to the test engine.

A generalized application of this security testing framework (broadened beyond CSRF vulnerability detection), may be summarized in the following phases:
  workflow recording,
  vulnerability candidate selection,
  vulnerability detection through request mutation, and
  vulnerability validation.

Figure 13:
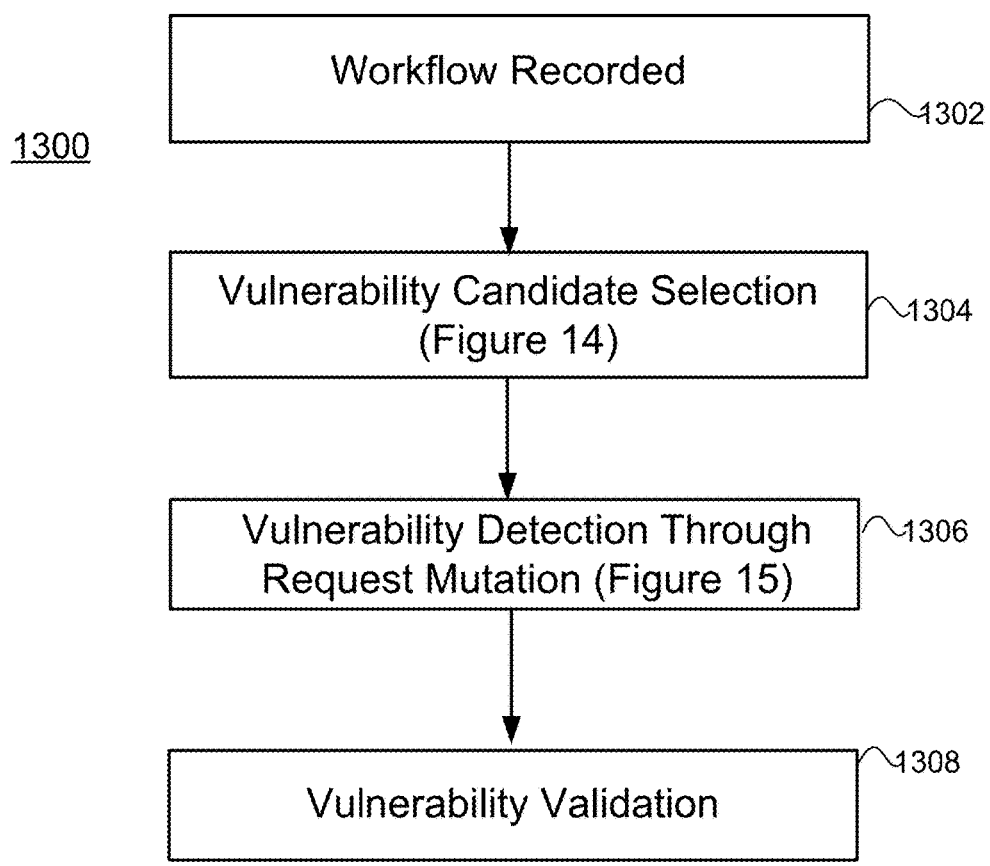
FIG. 13 shows a simplified flow diagram summarizing a generalized application of a security testing framework according to an embodiment.

These phases allow the identification of a larger set of vulnerabilities, and are summarized in the process flow diagram of FIG. 13.

In particular, a first phase 1302 of process flow 1300 is workflow recording. Here, application usage traces are recorded, to be re-run by the HTTP engine.

A second phase 1304 is vulnerability candidate selection. Here, the recorded traces are executed against the application under test. Depending on the set of relevant vulnerabilities, the various sensors and modules are queried for evidence indicating the potential presence of a vulnerability. If such evidence is found, a (UI interaction, HTTP request, evidence) triplet is added to the list of vulnerability candidates.

A third phase 1306 is vulnerability detection through request mutation. Here, the application usage trace is run again. Whenever the execution reaches a vulnerability candidate, the test engine stops the HTTP engine and triggers the mutation engine. The mutation engine creates multiple versions of the HTTP request, to trigger the suspected vulnerability. Between each test request, the server-side VM is reset to the previous application state, to avoid unwanted side effects. The server/client sensors are queried to assess, if a vulnerability was found. If this is the case, the HTTP request is added to the list of exploit candidates.

A fourth phase 1308 is vulnerability validation. Here, exploit candidates are validated in respect to their context free replayability and other vulnerability pre-conditions.

Further details regarding the generalized testing approach are now provided. For workflow recording, the first step is to record application usage traces, to be re-run by the HTTP engine.

Figure 14:
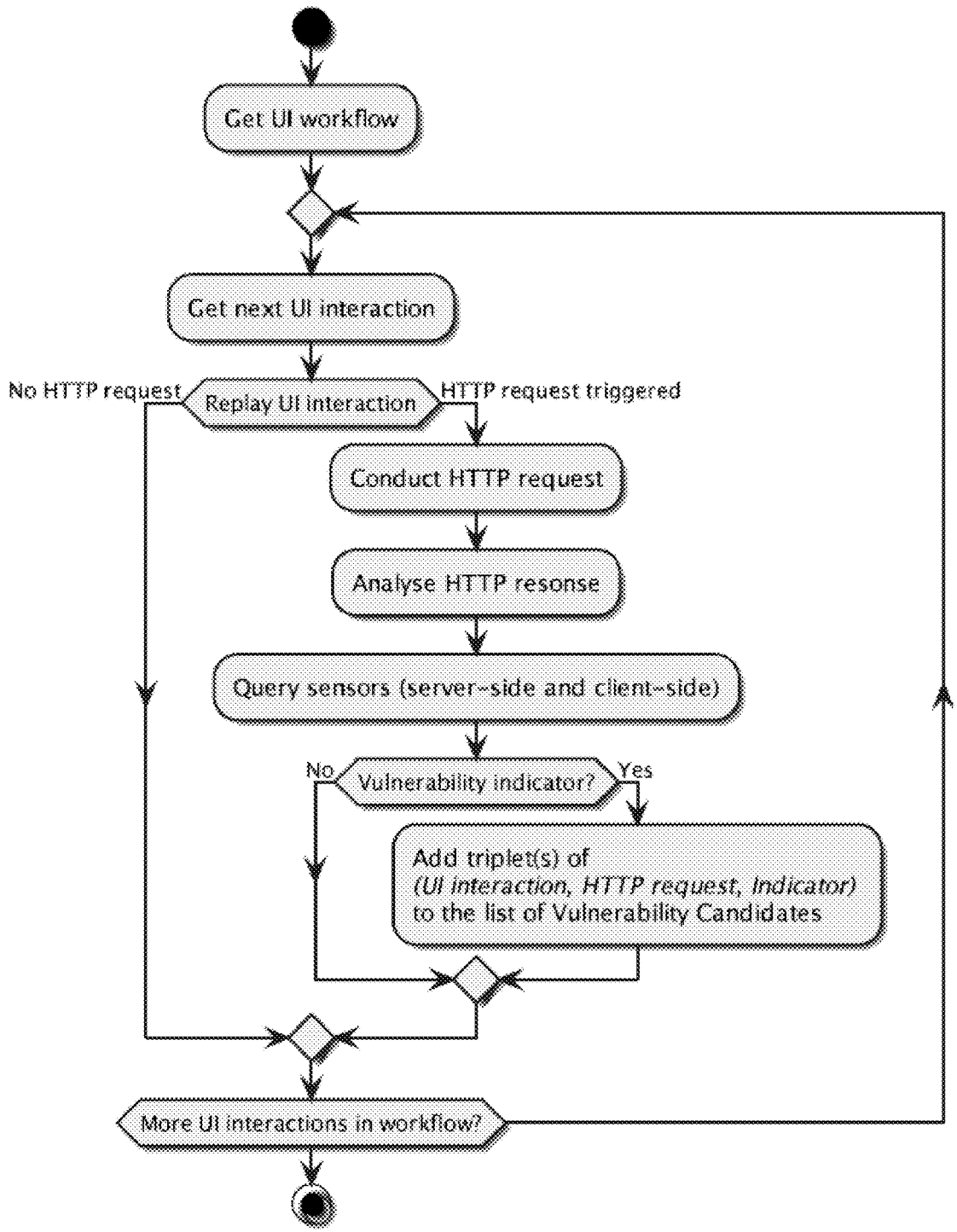
FIG. 14 is a simplified flow diagram showing generalized vulnerability candidate selection according to an embodiment.

For vulnerability candidate selection, the recorded traces are executed against the application under test. Depending on the set of relevant vulnerabilities (e.g., SQL injection, remote command execution, cross-site scripting, discussed below), the various sensors and modules are queried for evidence that indicates the potential presence of a vulnerability. If such evidence is found, the (UI interaction, HTTP request, evidence) triplet is added to the list of vulnerability candidates. This process of vulnerability candidate selection is summarized in the flow diagram of FIG. 14.

Figure 15:
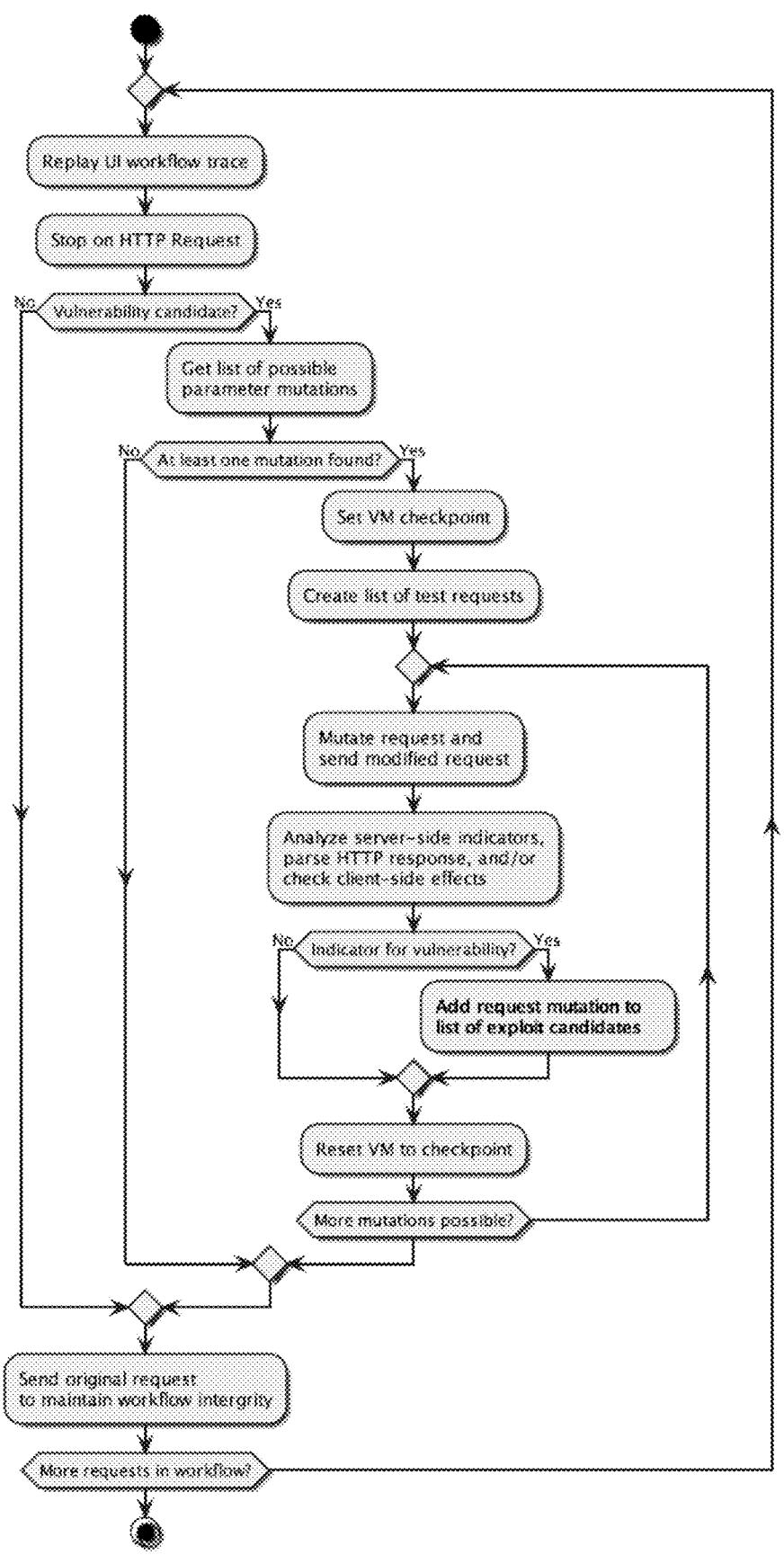
FIG. 15 is a simplified flow diagram showing generalized vulnerability detection through request mutation according to an embodiment.

For the vulnerability detection through request mutation phase, the application usage trace is run again. Whenever the execution reaches a vulnerability candidate, the test engine stops the HTTP engine and triggers the mutation engine. The mutation engine creates multiple versions of the HTTP request, to trigger the suspected vulnerability. Between each test request, the server-side VM is reset to the previous application state, to avoid unwanted side effects. The server/client sensors are queried to assess if a vulnerability was found. If this is the case, the HTTP request is added to the list of Exploit Candidates. FIG. 15 shows an overview of a general vulnerability detection approach.

For the vulnerability validation phase, exploit candidates are validated in respect to their context-free replayability and other vulnerability pre-conditions. Now, the leveraging of the above general testing approach to detect a variety of vulnerability classes (e.g., including but not limited to CSRF vulnerabilities, is discussed in detail.

The system components described above in connection with FIG. 2, may be extended or refined to accommodate the specific requirements of the vulnerabilities. In general, the first and last step of the general detection process (workflow recording, vulnerability validation) are unchanged from the CSRF discussion above. Accordingly, the following disclosure focuses upon adaptation of the vulnerability candidate selection and vulnerability detection through request mutation phases.

One vulnerability class which may be detected utilizing a testing platform according to embodiments, is SQL injection. SQL injection vulnerability occurs if data from an HTTP request is used without changes within a SQL statement, in a fashion that allows changing the syntactical structure of the query.

During the vulnerability candidate selection phase, in order to identify potential SQL injections the augmented server-side runtime is outfitted with sensors at the database connectors (as described above for CSRF testing). This way, all SQL queries generated by the application can be monitored by the Test Engine. Whenever a string match between the HTTP Engine's request parameters and the SQL query is found, a potential data flow from the request into the SQL statement is identified. Thus, the HTTP request is added to the list of Vulnerability Candidates.

During the vulnerability detection through request mutation phase, owing to the positive string matching result, the exact location of the potentially attacker controlled data within the SQL query is known. Thus, the mutation engine can create precise attack payloads tailored to syntactic context of the injection point. The mutation engine creates test requests that try to alter the syntactic structure of the SQL statement. Thus the mutation engine tries to actively create successful SQL injection exploits.

To check if the injection was successful, the test engine utilizes a SQL parser to obtain the syntactic structure of the generated SQL query, e.g., in the form of an AST, and compares it to the structure of the attack-free query. If the two structures differ, a vulnerability was found and the request is added to the exploit candidates.

Remote command execution is another class of vulnerability that may be detected and tested according to embodiments. A remote command execution vulnerability allows the attacker to inject his own syntax into run-time generated code on the server-side. This happens whenever parts of the HTTP request are used without cleaning, in strings that are passed to code generating APIs, such as eval( ).

Additional sensors may be used. Specifically, here code generating APIs are wrapped, so that strings passed to these APIs are recorded and passed to the test engine. Furthermore, a vulnerability validation API is added to the server-side run-time. This API is not used by legitimate application code. However, generated test payloads attempt to call this API. This allows precise and unambiguous vulnerability validation.

The vulnerability candidate selection phase for remote command execution vulnerabilities is now discussed. Similar to the SQL injections case, whenever a string match between the HTTP Engine's request parameters and the string that is evaluated exists, a potential vulnerable data flow is identified. Thus, the HTTP request is added to the list of Vulnerability Candidates.

The vulnerability detection through request mutation phase for remote command execution vulnerabilities is now discussed. The test engine parses the potentially vulnerable code statement and identifies the syntactic constraints of the suspected injection point. Using this information, the mutation engine creates variants of the HTTP requests, in which the HTTP parameter that is used in the code generation process contains an attack payload which, when it is successfully executed, calls the vulnerability validation API. If such a call was conducted, a clear indicator for a code injection vulnerability was found.

Cross-site scripting (XSS) is still another class of vulnerability that may be detected and tested according to embodiments. Cross-site scripting is one of the most prevalent and serious vulnerability classes in modern web applications. XSS denotes vulnerabilities, in which the attacker can inject his own JavaScript into the application's web code (HTML/JavaScript/CSS).

Additional Sensors may be used. In particular, to detect XSS the Mutation Engine not only intercepts the HTTP requests, but also intercepts the HTTP responses, in order to allow the test engine an examination of the generated web code. Furthermore the HTTP engine (which is based on a web browser engine) is extended such that, similar to the Remote Command Execution test, a vulnerability validation API is added to the browser's global JavaScript namespace. This API will be called by successfully injected attack payloads.

For the vulnerability candidate selection phase, unlike other vulnerability classes almost all HTTP requests that cause an HTTP response are potential XSS candidates. Thus, instead of selecting individual HTTP requests, this step identifies HTTP requests that are not interesting for this vulnerability class. More specifically, HTTP requests that cause responses with specific MIME types (such as images or audio files) are excluded from the list of vulnerability candidates, as XSS with these static, non-HTML resources is impossible.

For the vulnerability detection through request mutation phase, the mutation engine subsequently alters all HTTP parameters with unambiguous values and utilizes the parsing of the HTTP requests to identify the locations of these values within the web code, in case they are used by the application in web code generation. Then, for all parameters that are reflected this way, matching attack payloads are generated.

To check if the injection was successful, instead of imprecise and error prone HTML parsing of the HTTP request (as it is done in traditional dynamic application security testing approaches), embodiments pass the HTTP response to the HTTP engine's web browser. The injected payloads are built so that the injected code calls the vulnerability validation API. Hence, every call to this API precisely identifies a real XSS vulnerability.

It is noted that testing platforms according to embodiments are not limited to the discussed vulnerability classes. In general, detection methods for a variety of relevant security issues in modern web applications (e.g., those involving authorization management) can be integrated through matching sensors and request mutations.

Embodiments of testing platforms to detect security vulnerabilities in web applications according to embodiments, may offer one or more benefits. For example, embodiments can be used to precisely find a wide range of vulnerabilities, including CSRF, SQL Injection, XSS or Remote Command Execution.

Furthermore, embodiments may overcome shortcomings in established dynamic application security testing (DAST) techniques. For example, such tools have no insight in the actual server-side effects resulting from the test HTTP requests. Instead, heuristics have to be used, solely based on the corresponding HTTP response's content (e.g., a HTTP 500 response indicating a SQL error which hints at the existence of a SQL injection vulnerability). Thus, they expose high degrees of imprecision resulting in false positives and false negatives.

By contrast, embodiments do not rely on heuristics to detect security issues such as SQL Injection. Using the server-side and client-side sensors, embodiments can precisely measure the effects of the test requests and, thus, can exactly determine, if a given test triggered a vulnerability.

Embodiments also address blind vulnerabilities. Specifically, traditional black box dynamic security testing approaches rely on the fact that evidence for security issues is present in the HTTP responses. Thus, vulnerabilities that do not manifest themselves in the HTTP layer (such as Blind SQL Injection or Blind)(Path Injection) cannot be found by these techniques. By contrast, using the server-side sensors (e.g., at the database connectors or at the dynamic code generation APIs), vulnerabilities that do not influence the HTTP response can be found reliably by embodiments.

Embodiments may also avoid side effects during testing. For example, conventional testing applications are executing their tests against a running instance of the web application under test. Thus, every HTTP message send to the application under test potentially changes the server-side state. This hinders the detection of vulnerabilities, as most vulnerabilities rely on a specific server-side state to be active.

An example is a vulnerability that can only be triggered (and thus detected) if the test user is logged into the application. Now, a black box scanner has no knowledge on the semantics of the exposed controls and HTTP interfaces. Thus, it is as likely that the tool triggers an action that changes the authentication state (e.g., through pressing a log-out button or through causing an error that terminates the current application process) as it is likely that the tool accesses the actual vulnerable code.

By contrast, a virtualized server side platform allows side-effect free testing. After each test request, the server side state is reset into a clean state, as it existed before the conducted request. Thus each request is executed against a clean, error-free application state.

Embodiments may also avoid potentially destructive tests. While some possible side effects of convention approaches are temporary (such as authentication or process state), black box testing can also cause accidental permanent changes (up to data destruction), which in turn renders the remaining testing effort incomplete.

An example is the accidental deletion of an data item that otherwise would be instrumental in the discovery of a security problem. If a testing HTTP request of the tool leads to the deletion of the data, all further tests concerning the data item cannot be executed anymore, again leaving the testing effort incomplete.

By contrast, the virtualized server side platform allows a wide range of potentially disruptive tests, which are out of reach for traditional DAST applications. Event test requests that would delete data or disrupt resources can be executed, given that following the request the VM is set back to the previous application state.

Embodiments may also offer deep functionality. Specifically, conventional black box testing tools have no inherent knowledge about an application's semantics or functionality. They are reduced to blind interaction with the HTTP interface that can be obtained through analyzing the received HTTP responses. Thus, it is unlikely-to-impossible for these testing approaches to reach functionality that is deeper within the application (such as the later steps in a multi-step work flow).

By contrast, embodiments do not rely on a crawler engine or other imprecise attempts to interact with the application. Instead, the HTTP engine replays sophisticated application usage traces, thus allowing the test engine to reach deep application logic, which will not be touched by the established DAST tools. In addition, to following the traces, at each point in the test embodiments can utilize an additional crawler from the current point in the process workflow, even widening the test range and code coverage.

Aspects of certain embodiments may be contrasted with other approaches vulnerability detection and testing approaches. For example, with Static Application Security Testing (SAST), the code of a given application is analyzed without actually executing it. Different methods are used to reason about the properties of the code. SAST suffers from imprecision issues, resulting in both false positives and false negatives, especially when it comes to workflow dependent vulnerabilities.

Regarding black-box DAST approaches, these do not require access to the source code or other development artifacts of the application under test. Instead, the security test is conducted via interaction with the running software.

One known form of black-box security testing is manual penetration testing. In a penetration test, an application or system is tested from the outside in a setup that is comparable to an actual attack from a malicious third party. Manual penetration tests are naturally limited in the range and amount of tests that can be executed. By contrast, embodiments automate potential security tests a human penetration tester could conduct, without losing the human's guidance through the application's functionality thanks to the replay of recorded application usage traces.

In general penetration tests are a combination of manual testing through security experts and the usage of black-box vulnerability scanners. Black-box web vulnerability scanners are a class of tools that can be used to identify security issues in applications through various techniques. The scanner queries the application's interfaces with a set of pre-defined attack payloads and analyses the application's responses for indicators if the attack was successful and, if this is not the case, hints how to alter the attack in the subsequent tries.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, by a server hosting a web application, a trace comprising a first value provided by a browser component;
   storing the trace in an in-memory database;
   creating, by the server, a snapshot of a virtualized state of the web application at a time of receiving the trace;
   generating a mutant trace having the first value changed to a second value by an in-memory database engine of the in-memory database;
   sensing, by the in-memory database engine at the server, a change in persistence resulting from the mutant trace; and
   in response to the sensing, the server communicating the mutant trace to a test engine for identification of a security vulnerability.

2. A method as in claim 1 wherein the sensing occurs at a file system.

3. A method as in claim 1 wherein:
   the sensing occurs at the in-memory database; and
   the security vulnerability comprises a cross-site request forgery (CSRF) vulnerability.

4. A method as in claim 1 wherein:
   the sensing occurs at the in-memory database; and
   the security vulnerability comprises a SQL injection vulnerability.

5. A method as in claim 1 wherein:
   the sensing comprises detecting injection of a payload of the mutant trace; and
   the method further comprises issuing, by the payload, a call to an application program interface (API).

6. A method as in claim 5 wherein:
   the issuing comprises issuing the call to the API residing on the server; and
   the security vulnerability comprises a remote command execution vulnerability.

7. A method as in claim 1 wherein:
   the security vulnerability comprises a cross-site scripting (XSS) vulnerability.

8. A method as in claim 7 further comprising:
   generating, by the server, a response to the mutant trace; and
   communicating, by the server, the response to the in-memory database engine.

9. A method as in claim 7 wherein:
   the sensing comprises detecting injection of a payload of the mutant trace; and
   the method further comprises issuing, by the payload, a call to an application program interface (API) residing on the browser component.

10. A method as in claim 1 wherein the in-memory database engine is further configured to perform a selection function.

11. A method as in claim 1 wherein the in-memory database engine is further configured to perform a filtering function.

12. A non-transitory computer readable storage medium embodying a computer program for performing a method, said method comprising:
    receiving, by a server hosting a web application, a trace comprising a first value provided by a browser component;
    storing the trace in an in-memory database;
    creating, by the server, a snapshot of a virtualized state of the web application at a time of receiving the trace;
    generating a mutant trace having the first value changed to a second value by an in-memory database engine of the in-memory database;
    sensing, by the in-memory database at the server, a change in persistence in a database resulting from the mutant trace; and
    communicating, by the server, in response to the sensing, the mutant trace to a test engine for identification of a security vulnerability.

13. A non-transitory computer readable storage medium as in claim 12 wherein:
    the sensing comprises detecting injection of a payload of the mutant trace; and
    the method further comprises issuing, by the payload, a call to an application program interface (API).

14. A non-transitory computer readable storage medium as in claim 13 wherein:
    the issuing comprises issuing the call to the API residing on the server; and
    the security vulnerability comprises a remote command execution vulnerability.

15. A non-transitory computer readable storage medium as in claim 12 wherein:
    the issuing comprises issuing the call to the API residing on the browser component; and
    the security vulnerability comprises a cross-site scripting (XSS) vulnerability.

16. A non-transitory computer readable storage medium as in claim 12 wherein the security vulnerability comprises a cross-site request forgery (CSRF) or a SQL injection.

17. A computer system comprising:
    one or more processors;
    a software program, executable on said computer system, the software program configured to cause a server hosting a web application to:
    receive a trace comprising a first value provided by a browser component;
    store the trace in an in-memory database;
    create a snapshot of a virtualized state of the web application at a time of receiving the trace;
    generate a mutant trace having the first value changed to a second value by an in-memory database engine of the in-memory database;

sense by the in-memory database a change in persistence resulting from the mutant trace, the change in persistence comprising injecting a payload of the mutant trace, the payload issuing a call to an application program interface (API); and communicate, in response to the sensing, the mutant trace to a test engine for identification of a security vulnerability.

18. A computer system as in claim 17 wherein:

the issuing comprises issuing the call to the API residing on the server; and the security vulnerability comprises a remote command execution vulnerability.

19. A computer system as in claim 17 wherein:

the issuing comprises issuing the call to the API residing on a browser component; and the security vulnerability comprises a cross-site scripting (XSS) vulnerability.

20. A computer system as in claim 17 wherein the software program is configured to further cause the server to:

generate a response to the trace; and communicate the response to the in-memory database engine.

* * * * *